(12) United States Patent
Marsh et al.

(10) Patent No.: US 12,394,274 B2
(45) Date of Patent: Aug. 19, 2025

(54) ELECTRONIC GAMING MACHINE AND SYSTEM WITH DYNAMIC REEL WALL DEFORMATION THROUGH METAMORPHIC REEL SYMBOL EXPANSION

(71) Applicant: Aristocrat Technologies, Inc. (ATI), Las Vegas, NV (US)

(72) Inventors: David Marsh, Charlottesville, VA (US); Karl Roelofs, Charlottesville, VA (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 309 days.

(21) Appl. No.: 18/306,701

(22) Filed: Apr. 25, 2023

(65) Prior Publication Data

US 2024/0112529 A1 Apr. 4, 2024

Related U.S. Application Data

(60) Provisional application No. 63/411,762, filed on Sep. 30, 2022.

(51) Int. Cl.
*G07F 17/32* (2006.01)
*G06F 7/58* (2006.01)

(52) U.S. Cl.
CPC .......... *G07F 17/3213* (2013.01); *G06F 7/588* (2013.01); *G07F 17/3267* (2013.01); *G07F 17/329* (2013.01)

(58) Field of Classification Search
CPC .... G07F 17/32; G07F 17/3213; G07F 17/326; G07F 17/3262; G07F 17/3265; G07F 17/3267; G07F 17/329; G07F 17/34
See application file for complete search history.

(56) References Cited

U.S. PATENT DOCUMENTS

| | | | | |
|---|---|---|---|---|
| 8,182,330 | B2 * | 5/2012 | Nguyen | G07F 17/3265 463/20 |
| 8,616,953 | B2 * | 12/2013 | Yi | G07F 17/34 463/31 |
| 9,495,839 | B2 * | 11/2016 | Aoki | G07F 17/3213 |
| 9,666,020 | B2 * | 5/2017 | Gobe | G07F 17/3244 |
| 10,157,516 | B2 * | 12/2018 | Hendricks | G07F 17/32 |
| 12,211,342 | B2 * | 1/2025 | Soong | G07F 17/3225 |

(Continued)

*Primary Examiner* — Milap Shah
(74) *Attorney, Agent, or Firm* — Weaver Austin Villeneuve & Sampson LLP

(57) ABSTRACT

Disclosed are video slot games, including Class II and III gaming machines and systems, comprising a five reel video (5RV) arrangement that includes metamorphic symbols that incrementally expand, enlarge, balloon, widen, lengthen, or grow, e.g., when the metamorphic symbol lands on a predetermined position, or a winning payline, and that communicate the effect to the player of the incremental growth or increase in size by providing an enhanced user interface with information about the player's progress toward a potential special awards or status. The metamorphic symbols may incrementally expand, enlarge, balloon, widen, lengthen, or grow with each successive winning land, and may, in some examples, ultimately snap, crack, pop, deflate, or explode, while optionally deforming adjacent presentations to provide various award enhancements.

20 Claims, 28 Drawing Sheets

(56) References Cited

U.S. PATENT DOCUMENTS

| | | | |
|---|---|---|---|
| 2009/0286588 A1* | 11/2009 | Jackson | G07F 17/34 463/20 |
| 2011/0212759 A1* | 9/2011 | Gail | G07F 17/3276 463/16 |
| 2014/0004924 A1* | 1/2014 | Lerias, III | G07F 17/326 463/20 |
| 2014/0274288 A1* | 9/2014 | Hornik | G07F 17/326 463/20 |
| 2015/0011291 A1* | 1/2015 | Nauman | G07F 17/34 463/20 |
| 2017/0092073 A1* | 3/2017 | Nakamura | G07F 17/3213 |
| 2020/0219358 A1 | 7/2020 | Kania | |
| 2020/0250936 A1* | 8/2020 | Bryant | G07F 17/34 |
| 2021/0082241 A1 | 3/2021 | Marsh | |
| 2021/0082252 A1 | 3/2021 | Honeycutt | |
| 2021/0110676 A1* | 4/2021 | Davis | G07F 17/34 |
| 2021/0118259 A1 | 4/2021 | Mizzi | |
| 2021/0350678 A1* | 11/2021 | Warms | G07F 17/3265 |
| 2023/0326299 A1* | 10/2023 | Mirjavadi | G07F 17/3244 463/20 |
| 2023/0401931 A1* | 12/2023 | Milosevich | G07F 17/3267 |

* cited by examiner

ELECTRONIC GAMING MACHINE AND SYSTEM WITH DYNAMIC REEL WALL DEFORMATION THROUGH METAMORPHIC REEL SYMBOL EXPANSION

RELATED APPLICATION

The present application claims priority to U.S. Patent Application No. 63/411,762, filed Sep. 30, 2022, and entitled "Electronic Gaming Machine and System with Dynamic Reel Wall Deformation through Metamorphic Reel Symbol Expansion" which is hereby incorporated by reference in its entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

Machines, systems and methods are provided for Class II or Class III electronic gaming machines with a matrix of expandable reels depending on a primary game, substantially as shown in and/or described in connection with at least one of the figures, as set forth more completely in the claims.

Various examples of the present disclosure are directed to Class II electronic gaming machines, systems and methods. Some Class II electronic gaming machines, systems and methods present a primary game. The primary game may be a bingo game configuration that provides a bingo game outcome (and/or associated bingo game award) to a player via a spinning reel (and/or slot) game simulation, sometimes referred to as a reel-simulated bingo game. The sum of the one or more spinning reel game awards may be equal to the bingo game award. Conventional Class II games sometimes provide multiple winning bingo game patterns, with each winning bingo pattern having its own bingo game outcome and/or award. However, some Class II games have now evolved to only award the highest priority winning bingo game pattern.

In some examples, the bingo game outcome (and/or bingo game award) may trigger one or more metamorphic symbols to be displayed. The metamorphic symbols may be controllably expanded in size such that walls surrounding the metamorphic symbols may in turn be deformed such that volatility and/or return-to-player can be controlled. However, due to interface, display, monitor sizes or dimensions, expanding metamorphic symbol size while deforming walls to satisfy volatility and RTP targets, present multiple technical challenges. For example, one such challenge may include expanding metamorphic symbol size in a rate that is observable while adhering to satisfying the volatility and RTP targets in limited spaces due to display dimension.

To mitigate technical challenges discussed, such as jurisdictional compliance, gaming technologies, and user-interface capabilities, the present disclosure describes how the metamorphic symbols are controllably expanded in size such that walls surrounding the metamorphic symbols are deformed. When the metamorphic symbols have reached respective awardable states, the metamorphic symbols distributes their values, prices, or awards to one or more symbols spun through the matrix, thus increasing pay out to a player. Increasing metamorphic symbol size and deforming walls surrounding the metamorphic symbol, while satisfying volatility and RTP targets, may also further increase player satisfaction, engagement and/or excitement.

One embodiment provides an electronic gaming device that includes a player interface operable to determine player inputs, a display device operable to display a reel-simulated bingo game employing a plurality of reels, the plurality of reels having a plurality of display positions, respectively, and at least one reel sharing a wall of an adjacent reel, and a game controller comprising at least one processor and a memory storing a weighted table controlling a predetermined volatility, a symbol set having a plurality of game symbols and a plurality of metamorphic symbols, each of the plurality of metamorphic symbols having a plurality of states including an award state, and a plurality of sequences of instructions. The instructions may cause the at least one processor to at least control the display device to display at the plurality of display positions, in response to an occurrence of a trigger condition in a bingo game initiated via the player interface, a first metamorphic symbol selected based on the weighted table to control the predetermined volatility, and one or more game symbols selected randomly based on a random number generated by a random number generator, control the display device to animate the first metamorphic symbol being transformed into an expanded metamorphic symbol, and the wall associated with the expanded metamorphic symbol being deformed and overlaying at least a portion of the adjacent reel, and responsive to the expanded metamorphic symbol having reached the award state thereby further deforming the wall, control the display device to animate an effect associated with the expanded metamorphic symbol being distributed to one or more of the game symbols selected.

Another embodiment provides a method of controlling a predetermined volatility in a reel-simulated bingo game on a gaming device, the gaming device comprising a player interface operable to determine a player input, a display device operable to display the reel-simulated bingo game employing a plurality of reels, the plurality of reels having a plurality of display positions, respectively, and at least one reel sharing a wall of an adjacent reel, and a game controller comprising at least one processor and a memory storing a weighted table controlling the predetermined volatility, a symbol set having a plurality of game symbols and a plurality of metamorphic symbols, each of the plurality of metamorphic symbols having a plurality of states including an award state. The method may include receiving the player input to initiate a bingo game at the player interface, displaying at the plurality of display positions, in response to an occurrence of a trigger condition at the bingo game, a first metamorphic symbol selected based on the weighted table to control the predetermined volatility, and one or more game symbols selected randomly based on a random number generated by a random number generator, transforming the first metamorphic symbol into an expanded metamorphic symbol thereby deforming the wall associated with the expanded metamorphic symbol and overlaying at least a portion of the adjacent reel; and animating, responsive to the expanded metamorphic symbol having reached the award state thereby further deforming the wall, a distribution of the expanded metamorphic symbol to one or more of the game symbols selected.

Yet another embodiment provides a non-transitory computer-readable medium comprising a weighted table controlling a predetermined volatility, a symbol set having a plurality of game symbols and a plurality of metamorphic symbols, each of the plurality of metamorphic symbols having a plurality of states including an award state, and a plurality of sequences of instructions for operating a reel-simulated bingo game on a gaming device including a player interface operable to determine player inputs, a display device operable to display the reel-simulated bingo game employing a plurality of reels, the plurality of reels having a plurality of display positions, respectively, and at least one reel sharing a wall of an adjacent reel, and a game controller comprising at least one processor, and the plurality of sequences of instructions. When executed, the sequences of instructions cause the at least one processor to at least perform the steps of transmitting to the display device, in response to an occurrence of a trigger condition in a bingo game initiated via the player interface, data indicative of a first metamorphic symbol selected based on the weighted table to control the predetermined volatility, and one or more game symbols selected randomly based on a random number generated by a random number generator, for display at the plurality of display positions, causing the first metamorphic symbol to be visually transformed into an expanded metamorphic symbol, and in turn, the wall associated with the expanded metamorphic symbol to be visually deformed and to overlay at least a portion of the adjacent reel, and causing the expanded metamorphic symbol to visually distribute an effect associated with being distributed to one or more of the game symbols selected, responsive to the expanded metamorphic symbol having reached the award state.

Various advantages and features of the present disclosure will become apparent and more clearly understood in view of the detailed description, appended claims, and/or drawings of the present disclosure. In the following description, reference is made to drawings which show by way of illustration various disclosed examples that incorporate various examples of the present disclosure. These examples are described in sufficient detail to enable those skilled in the art to make or use the disclosed examples. Other examples may be utilized and other structural, logical, software, hardware, and electrical changes may be made without departing from the scope of the appended claims. The following description is, therefore, not to be taken in a limited sense.

BRIEF DESCRIPTION OF THE DRAWINGS

FIG. 1B depicts a casino gaming environment according to one example.

FIG. 1C is a diagram that shows examples of components of a system for providing online gaming according to some aspects of the present disclosure.

The figures are not necessarily to scale. Various dimensions may be exaggerated for illustrative clarity. Where appropriate, similar or identical reference numerals are used to refer to similar or identical components.

DETAILED DESCRIPTION

Figure 1A:
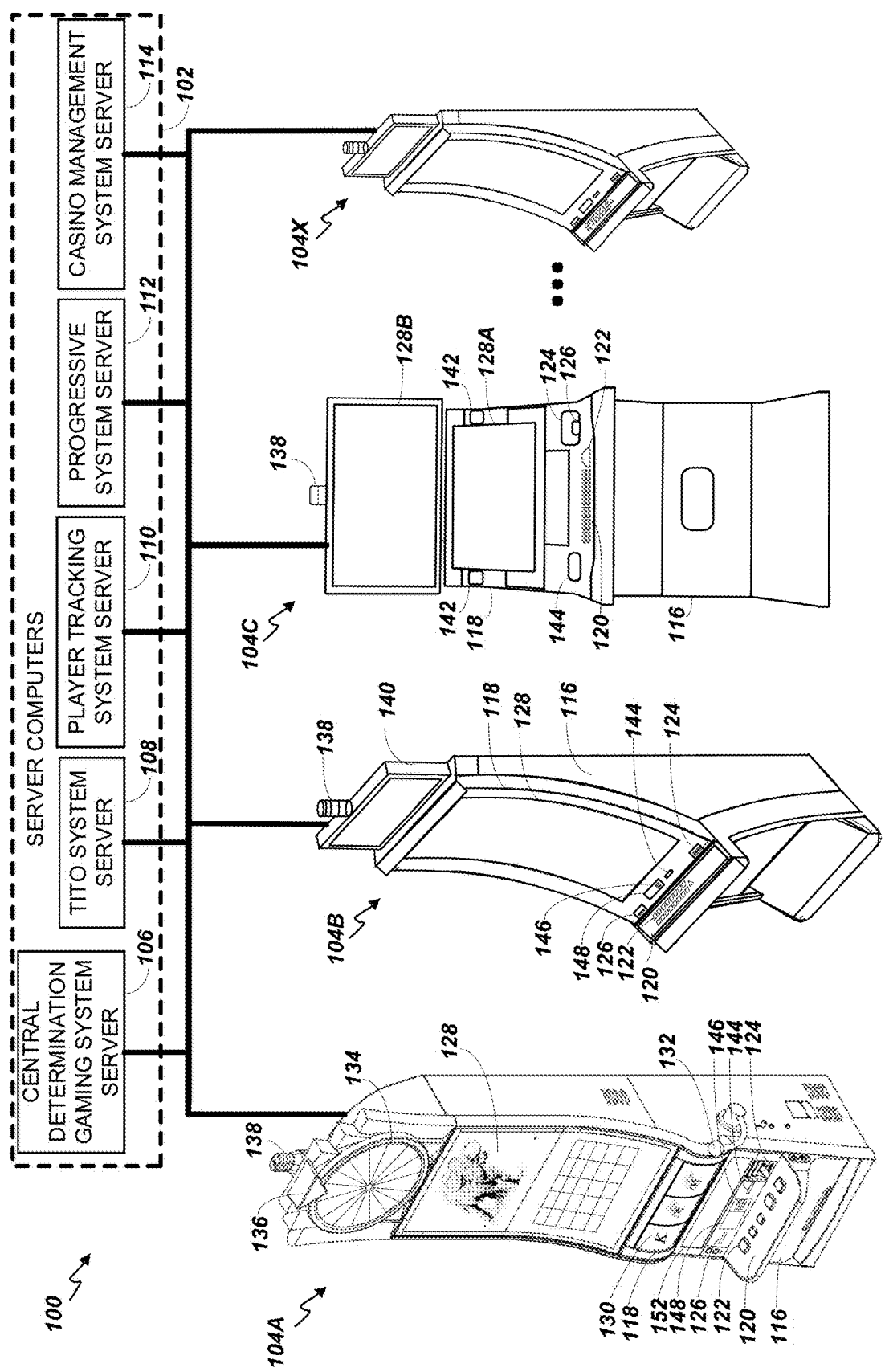
FIG. 1A-1C is an exemplary diagram showing several EGMs networked with various gaming related servers.

Examples disclosed include video slot games, including Class II and III gaming machines and systems, comprising a five reel video (5RV) arrangement that includes metamorphic reel symbols or metamorphic symbols that incrementally expand, enlarge, balloon, widen, lengthen, or grow, e.g., when the metamorphic symbol lands on a predetermined position, or a winning payline, and that communicate the effect to the player of the incremental growth or increase in size by providing an enhanced user interface with information about the player's progress toward a potential special award or status. The metamorphic symbols may incrementally expand, enlarge, balloon, widen, lengthen, or grow with each successive winning land, and may, in some examples, ultimately snap, crack, pop, deflate, or explode, while optionally deforming adjacent presentations to provide various award enhancements further described herein. The changing or evolving metamorphic symbol specially communicates player progression in one of several ways, e.g., by incrementally and dynamically deforming, or increasing the deformation of the adjacent reel walls or reel borders as the metamorphic symbol expands, enlarges, balloons, widens, lengthens, or grows and is being spun with the reel, while the deformed adjacent reels are spinning respective symbols thus optionally requiring dynamically adjusting appearances of the respective symbols being squeezed through a narrower reel space, by providing progress of growth through progress identifiers on the metamorphic symbol, and/or by a varied presentation of the potential award in the metamorphic symbol.

Examples of the present disclosure represent a technical improvement in the art of electronic gaming machines, systems, and operating for such electronic gaming machines or systems. For example, embodiments of the present disclosure allow a bingo game outcome to be simulated through a 5RV that comprises expandable metamorphic symbols and expandable metamorphic reel space. Specifically, when one or more metamorphic symbols are parts of a winning event, a processor determines from a weighted façade table whether to change or alter a state (e.g., initial expansion state, intermediate expansion state, final expansion state, explosion state, post explosion state) of the one or more metamorphic symbols, the graphical presentations of and/or award a value associated with the one or more metamorphic symbols. The increasing size of the metamorphic symbol with each successive winning spin provides increasing anticipation to a player, since it will not be known exactly when an award state will be reached, during each successive spin. By using the metamorphic symbols to communicate progress toward a special award with each successive winning spin, the metamorphic symbol simplifies burden on the player by reducing added layers of complicated rules and calculations, which may reduce processing and memory burdens caused by such rules and calculations on the gaming machine hardware as well.

Additionally, at least some examples of the present disclosure provide additional functionality in an electronic gaming machine to visually transform metamorphic symbols with a change of state of the metamorphic symbol, e.g., growing from smaller (initial expansion state) to larger (final expansion state) to cause deformation of the reel walls of the reels, while compressing against any adjacent reel and reel walls, to help communicate the chance of increased winnings. The change of state or the transitioning from one state to another state is a visual transformation that is configured with the volatility to achieve a return-to-player (RTP) that still complies with regulatory requirements for the bingo game operation even as the metamorphic symbols change states, e.g., expand and potentially explode, to provide enhanced awards. Such visual communication in the confined space of a gaming display is configured to engage the player by transforming presentation of the graphical user interface with reel wall deformation and the inclusion of various graphical information and animations at various state changes of the metamorphic symbol during successive spins.

Further, the visual modification of the metamorphic symbol characteristics also provides an improved game machine display such that the player may only need to focus on the reels as the reels are spun and the metamorphic symbol being displayed visually, along with state changes of the metamorphic reel, with each subsequent winning spin. As such, the player may anticipate the possibility of obtaining an immediate additional benefit, above and beyond the other potential awards of a base game. Further, if the metamorphic symbol grows in size to expand the reel walls or even explodes while other reel walls may be optionally compressed or simply overlapped, that change in state of the metamorphic symbol enhances the player's anticipation of the potential immediate additional benefits that may be obtained. This may further increase player satisfaction, engagement and/or excitement.

Examples of the present disclosure are not merely new game rules or simply new display patterns, but provide technological improvements to game display in the art of electronic gaming machines and software for such electronic gaming machines. For example, in some examples, the graphical increase in the metamorphic symbol values and/or size may be used in any Class II, Class III or remote gaming scenarios, thus improving existing gaming technology by incorporating a metamorphic symbol growth that may be dependent on Class II game outcomes. Moreover, the above example is not intended to be limiting, but merely exemplary of technological improvements provided by some examples of the present disclosure. Technological improvements of other examples are readily apparent to those of ordinary skill in the art in light of the present disclosure.

FIG. 1A illustrates a system 100A in a gaming environment. As shown, FIG. 1A illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some examples, server computers 102 may not be necessary and/or preferred. For example, in one or more examples, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

In the example of FIG. 1A, the server computers 102 may include a central determination gaming system server 106, a bingo server 107, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

In some examples, bingo game outcomes (e.g., for Class II reel-simulated bingo game implementations) may be generated and/or determined on the bingo server 107, such as during the play of Class II bingo, and then transmitted over the network to any the EGMs 104A-104X. The game instance may be communicated to EGM 200 via the network 214, as shown FIG. 2, and then displayed on EGM 200. For example, the bingo server 107 may generate a set of bingo numbers (e.g., a ball call), provide the bingo numbers to EGM 200 to compare with bingo card numbers, and/or determine a bingo game award that may then be displayed via the EGM 200. In some examples, a keno game instance (rather than a bingo game instance) may be generated using bingo server 107. In some examples, the bingo server 107 may be implemented and/or embodied in one of the other server computers 102.

In the example of FIG. 1A, gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1A, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In some examples, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some examples, the bill validator 124 may also function as a "ticket-in" reader that allows the player to use a casino issued credit ticket to load credits onto the gaming device 104A (e.g., in a cashless ticket ("TITO") system). In such cashless examples, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some examples, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such examples, a game controller within the gaming device 104A can communicate with the player tracking system server 110 to send and receive player tracking information. EGMs 104 may include a gaming signage system 152.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

Figure 2:
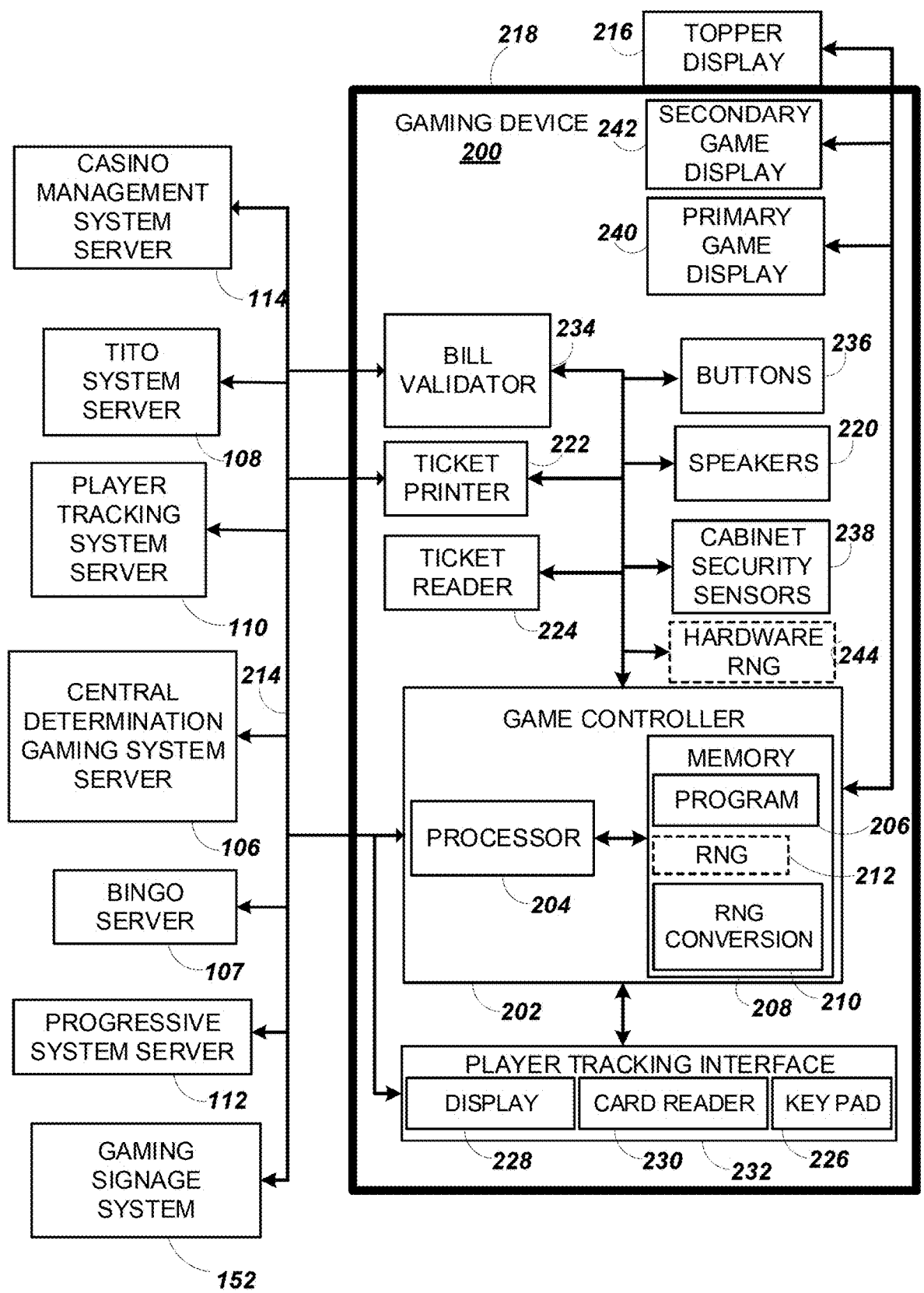
FIG. 2 is a block diagram showing various functional elements of an exemplary EGM.
Figure 3:
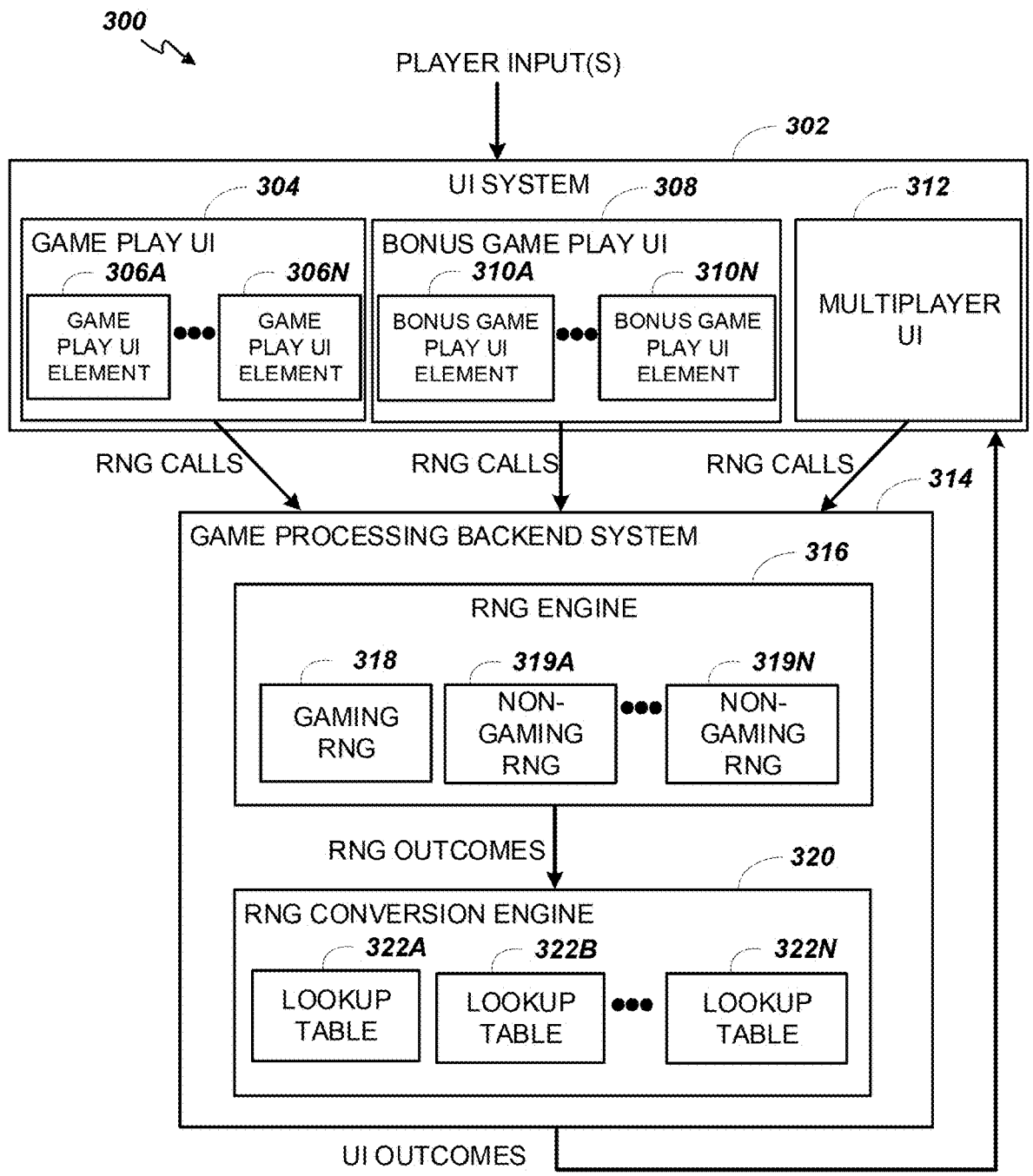
FIG. 3 illustrates, in block diagram form, an implementation of a game processing architecture algorithm that implements a game processing pipeline for the play of a game in accordance with various implementations described herein.

Gaming devices 104A have traditionally also included a handle 132 typically mounted to the side of main cabinet 116 which may be used to initiate game play. Many or all the above described components can be controlled by circuitry (e.g., a gaming controller) housed inside the main cabinet 116 of the EGM 104, the details of which are shown in FIG. 2.

Note that not all EGMs suitable for implementing examples of the present disclosure necessarily include top wheels, top boxes, information panels, cashless ticket systems, and/or player tracking systems. Further, some suitable EGMs have only a single game display that includes only a mechanical set of reels and/or a video display, while others are designed for bar counters or table tops and have displays that face upwards.

An alternative example gaming device 104B illustrated in FIG. 1A is the Arc™ model gaming device manufactured by Aristocrat® Technologies, Inc. Note that where possible, reference numerals identifying similar features of the gaming device 104A example are also identified in the gaming device 104B example using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some examples, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some examples, display 128A is a flat panel display. Main display 128A is typically used for primary game play while secondary display 128B is typically used for bonus game play, to show game features or attraction activities while the game is not in play or any other information or media desired by the game designer or operator. In some examples, the main display 128A may be used to provide a reel simulation dependent on another primary game, like a bingo game. In some examples, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class II or Class III, etc.

Figure 1B:
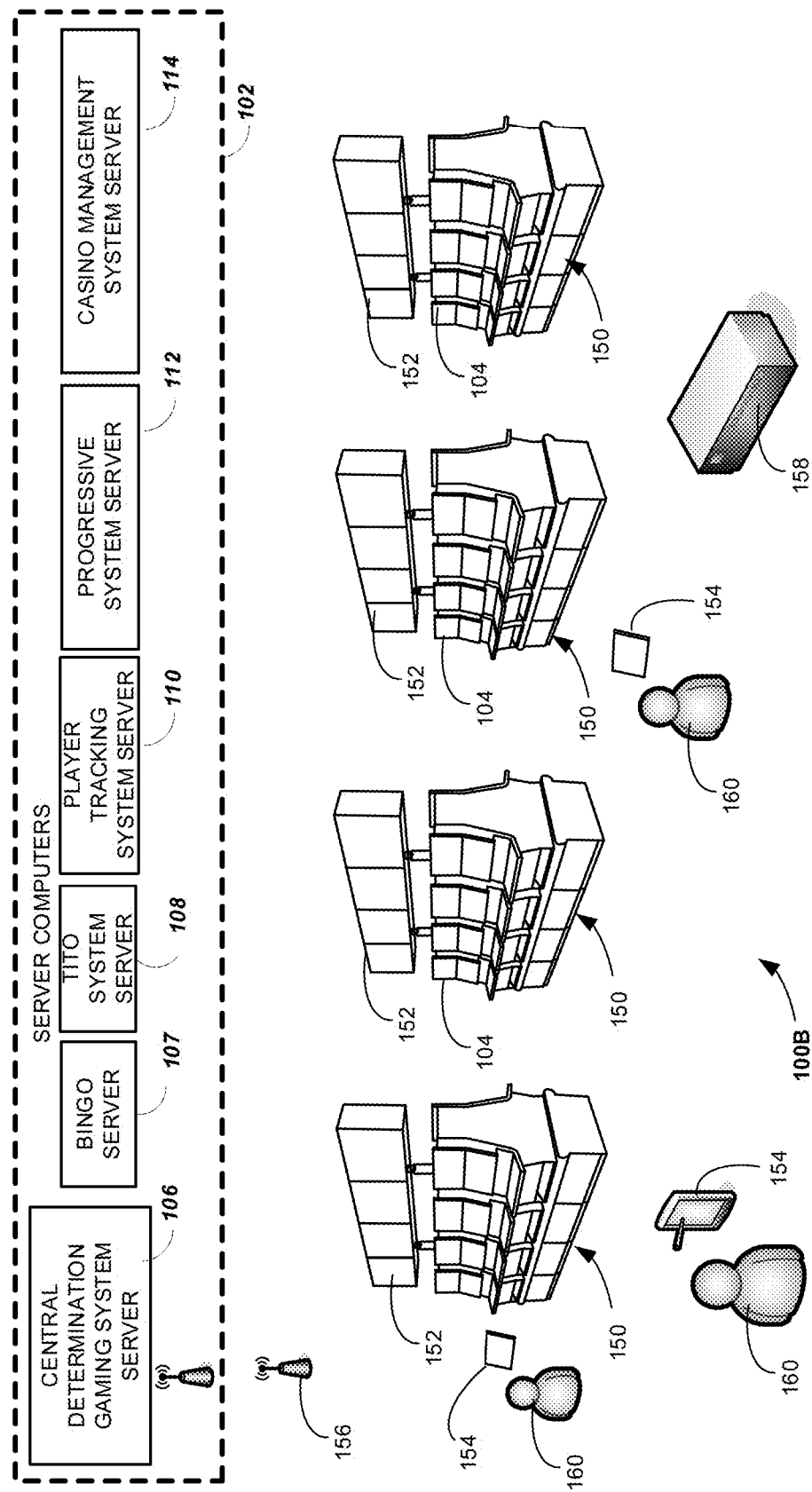

FIG. 1B depicts a casino gaming environment according to one example. In this example, the casino 100B includes banks 150 of EGMs 104. In this example, each bank 150 of EGMs 104 includes a corresponding gaming signage system 152. According to this implementation, the casino 100B also includes mobile gaming devices 154, which are also configured to present wagering games in this example. The mobile gaming devices 154 may, for example, include tablet devices, cellular phones, smart phones and/or other handheld devices. In this example, the mobile gaming devices 154 are configured for communication with one or more other devices in the casino 100B, including but not limited to one or more of the server computers 102, via wireless access points 156. Devices 154 may, for example, include tablet devices, cellular phones, smart phones and/or other handheld devices. In this example, the mobile gaming devices 154 are configured for communication with one or more other devices in the casino 100B, including but not limited to one or more of the server computers 102, via wireless access points 156.

According to some examples, the mobile gaming devices 154 may be configured for stand-alone determination of game outcomes. However, in some alternative implementations the mobile gaming devices 154 may be configured to receive game outcomes from another device, such as the central determination gaming system server 106, one of the EGMs 104, etc.

Some mobile gaming devices 154 may be configured to accept monetary credits. Some mobile gaming devices 154 may be configured to accept monetary credits from a credit or debit card, via a wireless interface (e.g., via a wireless payment app), via tickets, via a patron casino account, etc. However, some mobile gaming devices 154 may not be configured to accept monetary credits via a credit or debit card. Some mobile gaming devices 154 may include a ticket reader and/or a ticket printer whereas some mobile gaming devices 154 may not, depending on the particular implementation.

In some implementations, the casino 100B may include one or more kiosks 158 that are configured to facilitate monetary transactions involving the mobile gaming devices 154, which may include cash out and/or cash in transactions. The kiosks 158 may be configured for wired and/or wireless communication with the mobile gaming devices 154. The kiosks 158 may be configured to accept monetary credits from casino patrons 160 and/or to dispense monetary credits to casino patrons 160 via cash, a credit or debit card, via a wireless interface (e.g., via a wireless payment app), via tickets, etc. According to some examples, the kiosks 158 may be configured to accept monetary credits from a casino patron and to provide a corresponding amount of monetary credits to a mobile gaming device 154 for wagering purposes, e.g., via a wireless link such as a near-field communications link. In some such examples, when a casino patron 160 is ready to cash out, the casino patron 160 may select a cash out option provided by a mobile gaming device 154, which may include a real button or a virtual button (e.g., a button provided via a graphical user interface) in some instances. In some such examples, the mobile gaming device 154 may send a "cash out" signal to a kiosk 158 via a wireless link in response to receiving a "cash out" indication from a casino patron. The kiosk 158 may provide monetary credits to the patron 160 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 154 and/or a kiosk 158.

Some mobile gaming devices 154 may be configured for receiving and/or transmitting player loyalty information. For example, some mobile gaming devices 154 may be configured for wireless communication with the player tracking system server 110. Some mobile gaming devices 154 may be configured for receiving and/or transmitting player loyalty information via wireless communication with a patron's player loyalty card, a patron's smartphone, etc.

According to some implementations, a mobile gaming device 154 may be configured to provide safeguards that prevent the mobile gaming device 154 from being used by an unauthorized person. For example, some mobile gaming devices 154 may include one or more biometric sensors and may be configured to receive input via the biometric sensor (s) to verify the identity of an authorized patron. Some mobile gaming devices 154 may be configured to function only within a predetermined or configurable area, such as a casino gaming area.

Figure 1C:
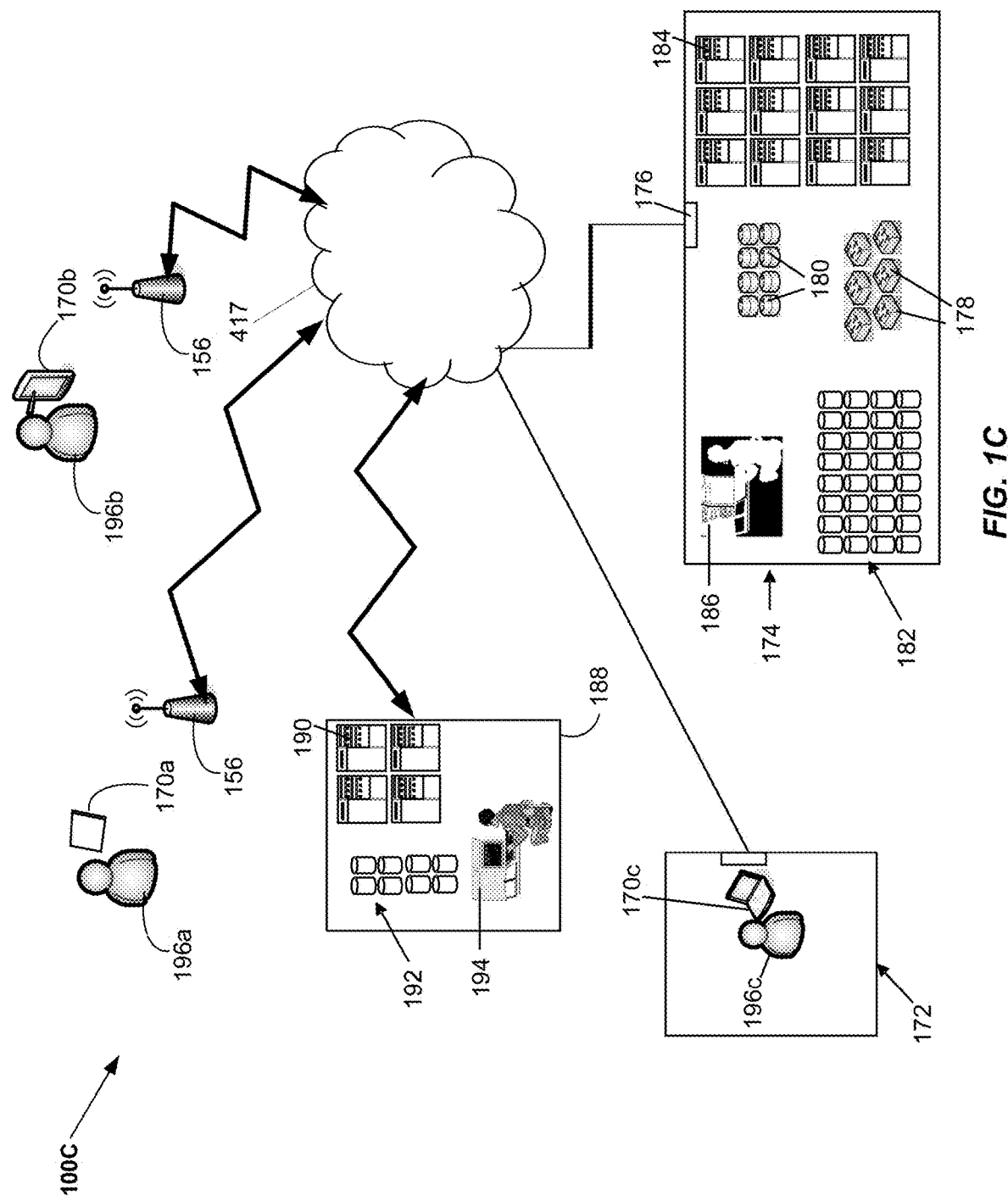

FIG. 1C is a diagram that shows examples of components of a system for providing an online gaming network 100C according to some aspects of the present disclosure. As with other figures presented in this disclosure, the numbers, types and arrangements of devices shown in FIG. 1C are merely shown by way of example. In this example, various devices, including but not limited to end user devices (EUDs) 170a, 170b and 170c are capable of communication via one or more networks 417. The networks 417 may, for example, include one or more cellular telephone networks, the Internet, etc. In this example, the EUDs 170a is a tablet device and 170*b* is a mobile device. In this implementation, the EUD 170*c* is a laptop computer that is located within a residence 172 at the time depicted in FIG. 1C. Accordingly, in this example, the hardware of EUDs is not specifically configured for online gaming, although each EUD is configured with software for online gaming. Other implementations may include other types of EUD, some of which may be specifically configured for online gaming.

In this example, a gaming data center 174 includes various devices that are configured to provide online wagering games via the networks 417. The gaming data center 174 is capable of communication with the networks 417 via the gateway 176. In this example, switches 178 and routers 180 are configured to provide network connectivity for devices of the gaming data center 174, including storage devices 182, servers 184 and one or more workstations 186. The servers 184 may, for example, be configured to provide access to a library of games for online game play. In some examples, code for executing at least some of the games may initially be stored on one or more of the storage devices 182. The code may be subsequently loaded onto a server 184 after selection by a player via an EUD and communication of that selection from the EUD via the networks 417. The server 184 onto which code for the selected game has been loaded may provide the game according to selections made by a player and indicated via the player's EUD. In other examples, code for executing at least some of the games may initially be stored on one or more of the servers 184. Although only one gaming data center 174 is shown in FIG. 1C, some implementations may include multiple gaming data centers 174.

In this example, a financial institution data center 188 is also configured for communication via the networks 417. Here, the financial institution data center 188 includes servers 190, storage devices 192, and one or more workstations 194. According to this example, the financial institution data center 188 is configured to maintain financial accounts, such as checking accounts, savings accounts, loan accounts, etc. In some implementations one or more of the authorized users 196*a*-196*c* may maintain at least one financial account with the financial institution that is serviced via the financial institution data center 188.

According to some implementations, the gaming data center 174 may be configured to provide online wagering games in which money may be won or lost. According to some such implementations, one or more of the servers 184 may be configured to monitor player credit balances, which may be expressed in game credits, in currency units, or in any other appropriate manner. In some implementations, the server(s) 184 may be configured to obtain financial credits from and/or provide financial credits to one or more financial institutions, according to a player's "cash in" selections, wagering game results and a player's "cash out" instructions. According to some such implementations, the server(s) 184 may be configured to electronically credit or debit the account of a player that is maintained by a financial institution, e.g., an account that is maintained via the financial institution data center 188. The server(s) 184 may, in some examples, be configured to maintain an audit record of such transactions.

In some alternative implementations, the gaming data center 174 may be configured to provide online wagering games for which credits may not be exchanged for cash or the equivalent. In some such examples, players may purchase game credits for online game play, but may not "cash out" for monetary credit after a gaming session. Moreover, although the financial institution data center 188 and the gaming data center 174 include their own servers and storage devices in this example, in some examples the financial institution data center 188 and/or the gaming data center 174 may use offsite "cloud-based" servers and/or storage devices. In some alternative examples, the financial institution data center 188 and/or the gaming data center 174 may rely entirely on cloud-based servers.

One or more types of devices in the gaming data center 174 (or elsewhere) may be capable of executing middleware, e.g., for data management and/or device communication. Authentication information, player tracking information, etc., including but not limited to information obtained by EUDs 170*a*-*c* and/or other information regarding authorized users of EUDs 170*a*-*c* (including but not limited to the authorized users 196*a*-*c*), may be stored on storage devices 182 and/or servers 184. Other game-related information and/or software, such as information and/or software relating to leaderboards, players currently playing a game, game themes, game-related promotions, game competitions, etc., also may be stored on storage devices 182 and/or servers 184. In some implementations, some such game-related software may be available as "apps" and may be downloadable (e.g., from the gaming data center 174) by authorized users.

In some examples, authorized users and/or entities (such as representatives of gaming regulatory authorities) may obtain gaming-related information via the gaming data center 174. One or more other devices (such EUDs 170*a*-*c* or devices of the gaming data center 174) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

FIG. 2 is a block diagram depicting exemplary internal electronic components of a gaming device 200 connected to various external systems. All or parts of the example gaming device 200 shown could be used to implement any one of the example gaming devices 104A-X depicted in FIGS. 1A-B. As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking.

FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202. In some examples, the display interface(s) above may include or complement one or more user interfaces, such as a touch screen, one or more buttons, a gesture recognition system, a voice recognition system, etc.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2 illustrates that game controller 202 includes a single memory 208, game controller 202 could include multiple memories 208 for storing program instructions and/or data.

Memory 208 can store one or more game programs 206 that provide program instructions and/or data for carrying out various examples (e.g., game mechanics) described herein. Stated another way, game program 206 represents an executable program stored in any portion or component of memory 208. In one or more examples, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game instances based on instructions and/or data that gaming device 200 exchanges with one or more remote gaming devices, such as a central determination gaming system server 106 (not shown in FIG. 2 but shown in FIGS. 1A-B). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2 illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards and Bingo game ball calls. In one or more examples, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2 illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2 illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards and Bingo game ball calls. In one or more examples, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2 illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

Although FIGS. 1A-B and 2 illustrate specific examples of a gaming device (e.g., gaming devices 104A-104X and 200), the disclosure is not limited to those examples shown in FIGS. 1A-B and 2. For example, not all gaming devices suitable for implementing examples of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1A-B and 2 are examples to facilitate ease of description and explanation.

Although FIGS. 1A-C and 2 illustrate specific examples of a gaming device (e.g., gaming devices 104A-104X and 200), the disclosure is not limited to those examples shown in FIGS. 1A-B and 2. For example, not all gaming devices suitable for implementing examples of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1A-B and 2 are examples to facilitate ease of description and explanation.

Figure 4:
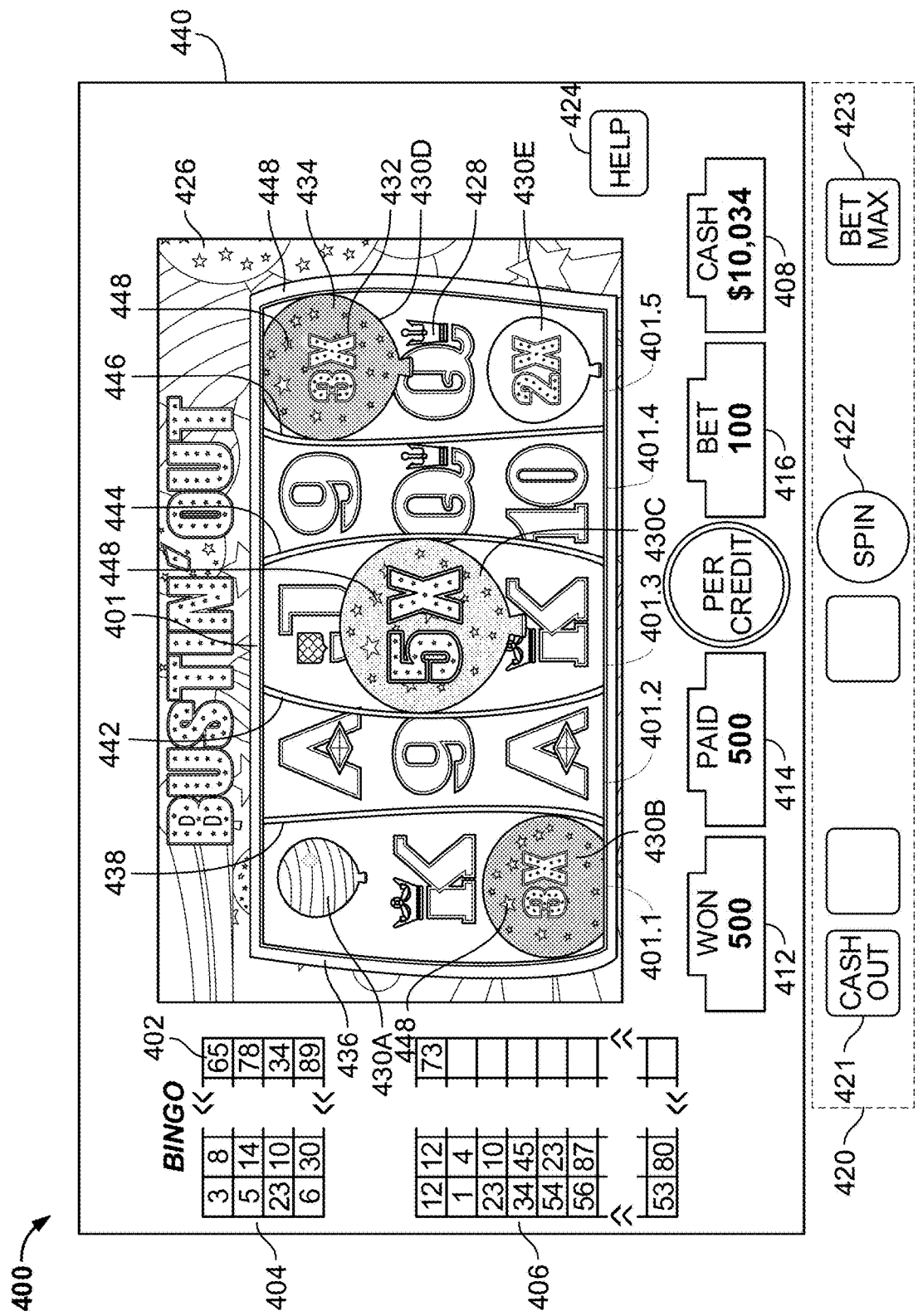
FIG. 4 is an example of a Class II game graphical user interface displaying a typical primary or base game mode in the form of bingo.

Turning to FIG. 4, FIG. 4 illustrates an example of a Class II bingo game 400 being displayed in a graphical user interface comprising a primary game display 440, similar to displays 240, 242 of the EGM 200 of FIG. 2. The Class II bingo game 400 shows a typical primary or base game mode in the form of a reel-simulated bingo game employing five reel video matrix 401 comprising one or more metamorphic symbols 430. In FIG. 4, the one or more metamorphic symbols 430 are displayed as metamorphic symbols 430A, 430B, 430C, 430D and 430E at various states progressing toward an award or special status state. A button deck 420 may comprise various physical or virtual buttons, e.g., a Cash Out button 421, a Spin button 422 and a Max Bet button 423.

In the example of FIG. 4, a plurality of reels in a reel matrix 401 are displayed within a portion of the graphical display 426 of the primary game display 440. While five video reels are shown to comprise the reel matrix 401 in the example of FIG. 4, in some examples, the plurality of reels may comprise more or less than five (5) reels with more or less rows and columns. In some examples, the reel matrix 401 may be implemented at least partially as mechanical reels. In other examples, the reel matrix 401 may be virtual reels, 2-dimensional reels, and/or 3-dimensional reels. As shown, the reel matrix 401 has a plurality of symbol display positions for presenting a set of standard symbols 428 (and/or symbol combinations) and one or more metamorphic symbols 430A-430E, which alone or together may be associated with winning and/or losing reel game outcomes and/or awards.

In the example of FIG. 4, a bingo card 404 and a bingo number listing 406 are displayed in the game display 440. As shown, the bingo card 404 comprises a matrix of bingo cells 402 (e.g., squares). In some examples, the bingo card matrix 404 may be a 5×5 matrix of 25 total cells. In some examples, the bingo card 404 may have a matrix of a different size that may be larger or smaller (e.g., 3×3, 4×4, 4×5, 4×6, 6×6, 7×7, 3×8, 10×10, etc.). In the example of FIG. 4, each cell 402 in the bingo card matrix 404 includes a number that is not repeated in any other cell of the bingo card 404.

In some examples, the bingo game may be a networked game that involves two or more networked EGMs 200. The bingo server 107 may manage (and/or host) the bingo game, such as by generating the bingo card 404 and/or bingo number listing 406. In some examples, the bingo card 404 (and/or information on which the bingo card 404 is based), and/or the bingo number listing 406 may be generated using an RNG (e.g., RNG 212 of FIG. 2). In some examples, the bingo card 404 may be randomly selected from a set of bingo cards or a player may select their own bingo card 404 (e.g., via the user interface), such as from a set of randomly generated bingo cards, for example.

In operation, a player and/or EGM 200 may be provided with the bingo card 404, such as by bingo server 107. For example, a player may be provided with a new bingo card 404 each time a "Spin" or "Play" button 420 is pressed by the player (e.g., via user interface), provided the player has made a wager or bet, or it is a free game. In some examples, more than one bingo card 404 may be generated in response to the wager. The bingo number listing 406 (e.g., "ball call") may be randomly generated, such as by bingo server 107. The bingo card 404 may be compared to the current bingo number listing 406, and numbered cells 402 on the bingo card 404 that match numbers in the bingo number listing 406 may be marked or "daubed" on the bingo card 404. Finally, the marked or daubed bingo card 404 may be evaluated against a paytable of winning bingo patterns.

The bingo number listing 406 may be continually generated until a maximum amount of numbers are listed (e.g., seventy-five numbers listed) or until a game-ending pattern is awarded to a player participating in the reel-simulated bingo game is implemented. A typical game-ending pattern may be a bingo card blackout pattern, in which each of the numbers of a bingo card 404 matches a number displayed in the bingo number listing 406. Other game-ending patterns are also possible. When the game-ending pattern is awarded, the bingo number listing 406 is reset, and the process repeats. In some examples, a single play of the bingo game includes a wager, a bingo card, a bingo number listing 406, a matching of the numbers called with those on a bingo card 404, a determination of a bingo game outcome, and a presentation or other graphical display, e.g., animation, of an associated award, if any.

A bingo game outcome may be determined by comparing one or more patterns of marked (and/or "daubed) cells of the bingo card 404 with the paytable of winning bingo patterns. If the bingo card 404 does not include a pattern that matches a pattern in the paytable of winning patterns, then a losing bingo outcome is determined, and no award may be provided to the player. If the bingo card 404 does include a pattern that matches a pattern in the paytable of winning patterns, then a winning bingo outcome is determined, and an award may be provided to the player.

Different winning patterns may be associated with different awards. The award for a winning main bingo game outcome may be based on an amount wagered, an associated main bingo game paytable, an associated set of rules for the main bingo game, a probability (and/or likelihood) of achieving a particular bingo pattern/combination, an amount of bingo numbers needed to achieve the particular bingo pattern/combination, and/or other considerations. In some examples, the player may be awarded for multiple patterns (e.g., all winning patterns) that are matched when the bingo card 404 is evaluated against the paytable of winning patterns. In some examples, the player may be awarded for only the highest priority pattern (e.g., the highest paying winning pattern) that is matched. In some examples, during play of a Class II game, a player is provided or selects a single bingo card 404 for multiple plays of the bingo game, with a new bingo number listing 406 generated for each play of the bingo game. Other methods of play of a Class II bingo game are also possible and are within the scope of this disclosure.

A bingo game win may be presented to the player via a spinning reel game simulation. In the example of FIG. 4, the spinning reel game is simulated via the plurality of reels of the reel matrix 401 in the primary game display 440. For each play of the bingo game, the bingo game win is presented as a win via a reel spin outcome in the reel game. In some examples, the spinning reel game simulation may operate by spinning each reel of the reel matrix 401 and then stopping each reel of the reel matrix 401 in a particular position to obtain a matrix of symbols. One or more combinations of standard or game symbols 428 and metamorphic symbols 430 in the reel matrix 401 may be associated with a reel game outcome that pays for the main bingo game win. As such, a winning bingo game outcome may be displayed as a winning combination of reels in the reel matrix 401. Similarly, a losing bingo game outcome may be displayed as a losing combination of reel matrix 401. Different outcomes or wins of the bingo game may be displayed as different outcomes or combinations in the spinning reel game. Thus, the bingo game outcome is presented or otherwise graphically displayed, e.g., animation, along with sound, to the player as a particular reel spin outcome from the plurality reels of the reel matrix that awards the same award or substantially the same award as the winning bingo game outcome win.

Returning to example of FIG. 4, the game display 440 further displays a credit meter 408 showing an amount of money and/or credits (e.g., credit balance) held by a player of the EGM 200. In the example of FIG. 4, the credit balance 308 shows $10,034. The display 440 additionally shows a wager meter 416 adjacent to the credit meter 408, under "BET." The amount wagered is 100 credits (e.g., $1.00). The amount wagered (e.g., via the user interface) may be deducted from the credit meter 408. The game display 440 additionally displays a win meter 412 and a total win meter 414. In the example of FIG. 4, the win meter 412 is 500, indicating that the simulated combination of symbols in the reels of the reel matrix 401 is associated with a 500-credit award (which is equal to the reward associated with the bingo game outcome). As shown, the total win meter 414 is 500 credits, indicating that the cumulative total of rewards received comprises just that one 500-credit reward. In some examples, the game display 440 may further display reel win information. The reel win information may include win line information and reward information. The win line information indicates which win line in the plurality reels of the reel matrix 401 contains symbols indicative of a winning reel game outcome. The reward information may indicate an associated reward amount for that winning reel game outcome.

Still referring to FIG. 4, the illustrative five reel matrix 401 comprises a plurality of reels, each of the plurality of reels has reel borders or reel walls, e.g., reel walls 436, 438, 442, 444, 446, and 448. In some examples, each reel of the plurality of reels of the reel matrix 401 may have its own respective vertical reel walls. In other examples, like that illustrated, each reel shares at least one reel wall with an adjacent reel. As shown in FIG. 4, the reel walls of reel 401.1 are 436 and 438, of reel 401.2 are walls 438 and 442, of reel 401.3 are walls 442 and 444, of reel 401.4 are walls 444 and 446, and of reel 401.5 are walls 446 and 448. Some or all of the reel walls 436, 438, 442, 444, 446, and 448 may be flexible, bendable, expandable, or deformable under certain circumstances. In other embodiments, some of the reel walls 436, 438, 442, 444, 446, and 448 may be rigid or not flexible, bendable, expandable, or deformable. For example, in some embodiments, reel walls 436 and 448 may be rigid walls that are not flexible, bendable, expandable, or deformable. Reel walls 436, 438, 442, 444, 446 and 448 may be displayed to deform based on a dynamic change in state (e.g., enlargement or expansion) of a metamorphic symbol 430 in a respective reel with each successive spin. That is, while some metamorphic symbols sandwiched between adjacent reel walls are expanding and thus deforming the adjacent reel wall, one or more neighboring reel walls may also be optionally animated as deformed or compressed correspondingly, resulting in some of the symbols in the neighboring reels being animated as compressed and/or overlapped.

Reel walls 436, 438, 442, 444, 446 and 448 may also be animated as being deformed, expanded, or compressed by varying amounts depending on a state among a plurality of animation states indicative of an amount of expansion of the metamorphic symbols 430 that are displayed in a symbol position on a reel. This varying deformation can vary within a given reel (e.g., reel 401.1) or across the reels (e.g., reels 401.1 and 401.3). In some embodiments, the reel walls 436, 438, 442, 444, 446 and 448 may be deformed at different deformation rates. For example, as shown in FIG. 4, metamorphic symbol 430A in reel 401.1 (sandwiched between walls 436 and 438) is at an initial state (which is typically a symbol at a standard size but may be smaller or larger) that is not causing the reel walls 436 and 438 of reel 401.1 (between walls 436 and 438) to deform, whereas metamorphic symbol 430B in reel 401.1 (between walls 436 and 438) is at an intermediate enlarged state (higher than metamorphic symbol 430A) that is causing a portion of the reel walls 436 and 438 of reel 401.1 to deform. As such, the reel walls are animated as unevenly deformed, narrower (closer to unexpanded walls) near symbol 430A but wider near symbol 430B. By way of another illustrative example, metamorphic symbol 430B in reel 401.1 is the intermediate enlarged state that is less than the metamorphic symbol 430C in reel 401.3 (sandwiched between walls 442 and 444). In this example, metamorphic symbol 430C is deforming walls 442 and 444 by a greater amount than deformation of the reel walls in 436 and 438 caused by the expanded state of the metamorphic symbol 430B in reel 401.1. Conversely, reel 401.2 sandwiched between walls 438 and 442 is also animated as unevenly compressed or deformed opposite as those for reel

401.1 and reel 401.3. The deformation of the reel walls may occur on any wall, horizontal or vertical.

Additionally, the deformation of a reel wall may be accompanied by a change in state (e.g., color, width, vibration or sound) of the wall itself to provide a further indication of how close the metamorphic symbol is to providing an award at different rates. The animation of the metamorphic symbol 430 during a spin will also cause the reel walls adjacent to the metamorphic symbol 430 to deform as the metamorphic symbol 430 moves across the display 440 in its respective reel. The deformation of a reel wall may overlay the adjacent reel in the reel matrix 401 or it may compress the symbol in the adjacent reel in the reel matrix 401 to a small sizer to accommodate the reel wall deformation of the adjacent reel. For example, in the embodiment shown in FIG. 4, the deformation of reel 401.3 overlays adjacent reels 401.2 and 401.3 such that symbol "A" is partially visible through the deformed reel 401.3, and symbol "Q" is also partially visible through the deformed reel 401.3. However, in other embodiments (not shown), the deformation of reel walls 436, 438, 442, 444, 446 and 448 may compress adjacent reels such that symbols from adjacent reels are not visible through any of the deformed reels. However, in still other embodiments, some reel walls may be displayed deformed and overlay adjacent reels such that symbols from adjacent reels may be visible through the deformed reels, while other reel walls may also be displayed deformed and compress adjacent reels such that symbols from adjacent reels may be invisible through the deformed reels.

Each of the reels in the reel matrix 401 comprises a set of symbol positions occupied by one or more of a plurality of symbols. The plurality of symbols may comprise many symbol types, including a standard game symbol 428, like a royal or picture symbol, and/or one or more metamorphic symbols, e.g., the balloon symbols 430A, 430B, 430C, 430D, and 430E illustrated in FIG. 4.

In FIG. 4, the one or more metamorphic symbols 430 are displayed as metamorphic symbols 430A, 430B, 430C, 430D and 430E at various states toward the progress of an award or special status. In one example, metamorphic symbols 430A, 430B, 430C, 430D and 430E, in FIG. 4 are shown as balloon symbols, and may have different colors or different decorations (e.g., include sub-symbols or art in a balloon symbol) to represent different effects they have on the game, different states they are in toward a potential award or different things that they might do.

For example, a red balloon (shown as light shade balloon in FIG. 4) may be used as a WILD, as shown by metamorphic symbols 430C in FIG. 4. A blue balloon (blue shown as dark shade in FIG. 4), as shown by metamorphic symbols 430B, may represent a multiplier award. A green balloon (green shown as blank background in FIG. 4) may represent a cash-on-reel (COR) award or it may represent a jackpot, like metamorphic symbols 430D in FIG. 5B. A stripped balloon, as shown by metamorphic symbols 430A, may represent mystery symbols that could, when revealed, contain Wilds, multipliers, or CORs. As a still further example, a yellow balloon could represent an ultimate balloon that would pop or explode, and initiate a domino effect or chain reaction that causes some or all displayed metamorphic symbols 430A, 430B, 430C, 430D and 430E displayed on the reels of the reel matrix 401 to pop or explode, and award their corresponding prize. Balloon symbols, of course, are one example. Other symbol types should be apparent to a person of skill in the art, e.g., pigs, ingots, babies, firecrackers, or others may also be used alternatively or concurrently.

Additionally, the metamorphic symbols can be sized differently to represent varying states reached toward an award or an award status. Sounds, other graphic indicators on the metamorphic symbols, or on the display, and/or animations related to metamorphic symbols may also be employed in conjunction with or apart from the different sizing to show progress toward the potential award. Graphic indicators on the metamorphic symbols could be a number or quantity of dollar signs that is proportional to the cash to be awarded. Thus, more dollar signs represent more cash to be awarded. By way of example, in FIG. 4, the metamorphic symbol 430A is at an initial state, metamorphic symbol 430B is an intermediate state, and metamorphic symbol 430C is at an advanced state nearing an award state indicative of a free spin and a 5× multiplier award to be awarded soon. Further to this example, in FIG. 4, graphic indicators on metamorphic symbols 430B, 430C, 430D and 430E indicate award multipliers that are proportional to the metamorphic states of the metamorphic symbols, e.g., 3×, 5×, 3× and, 2× award multipliers, respectively, that may be applied to a reel spin outcome if award of the symbol is triggered.

In some embodiments, the changing or evolving state of a metamorphic symbol, by growing, expanding, or resizing the metamorphic symbol, occurs by a random amount when the metamorphic symbol, e.g., a balloon symbol, lands on a winning payline. The metamorphic symbol will eventually reach the award state, which might be displayed as an enlarged balloon symbol cracking, deflating, snapping, or popping and followed by transforming into the award, e.g., a WILD, free spins, multipliers, etc. for distributing the award to some or all of other non-metamorphic symbols or game symbols being displayed. In some embodiments, a metamorphic symbol may be pseudo-metamorphic that may award a corresponding bingo prize at any time or expansion size, based on a random outcome generated by an RNG (such as the RNG 212 of FIG. 2), or the occurrence of a sufficiently large bingo award from a corresponding bingo game. The pseudo-metamorphic symbol may also drive or determine selecting of an appropriate façade to award the bingo prize. Thus, a larger metamorphic symbol may provide an indication of a greater period of time/number of spins from when the metamorphic symbol was last awarded.

As discussed above, metamorphic symbols may change states, or advance or transition from one state to a different state. The states of the metamorphic symbols, for example, may include an initial or starting state, an intermediate state, or a final or award state. Metamorphic symbol may change states at varying rates. For example, the higher the bet amount the faster the metamorphic symbol progresses from the initial state or the intermediate state to the award state. Although only three different states are described with respect to the embodiments, more or less quantity of states may also be employed. For example, there may be an initial intermediate state between the initial state and the intermediate state, and an advanced intermediate state between the intermediate state and the award state. For another example, the intermediate state may further include a plurality of sub-intermediate states that allows the initial intermediate state to grow continuously to the advanced intermediate state at rates that may be determined dynamically or in advance. In other embodiments, the quantity of states may be dependent on a denomination of the bet. For example, 1-cent denomination may have the most number of states indicating that advancing from the initial state to the award state may take longer than a 50-cent denomination which may have the least number of states, thus advancing from one state to another faster. Likewise, the smaller the bet amount the slower the metamorphic symbols progress to the award state. The metamorphic symbols may also increase the potential win values at varying rates depending on pre-determined parameters, like the size of the bet. For example, as the metamorphic symbol gets larger, the values potentially awardable increases as the size of the metamorphic symbols 430 increases. Likewise, an ante bet could increase the size of the metamorphic symbols 430 to be larger than the initial state, i.e., to start at an intermediate state. Also, the rate of progress toward an award could also be slowed down if the bet was not large enough. Still in other embodiments, progressing from the initial state to the intermediate state may be measurably and controllably different from progressing from the intermediate state to the award state.

Additionally, metamorphic symbols typically will appear on either reels 1, 3 and 5, or reels 2 and 4. This example may ensure that reel borders or walls 436, 438, 442, 444, 446, 448 do not touch during expansion of the metamorphic symbols against the reel walls which cause deformation, compression, or bending of the reel walls. Any of the reel walls may bend, compress, expand, or deform in view of an expansion of an adjacent metamorphic symbol. Other arrangements are possible, and may depend on the volatility that is permitted to achieve the desired return-to-player (RTP). The location of the metamorphic symbol in a reel matrix should be considered in relation to volatility so it does not become too expensive for the operator. Additionally, the number of weighted façade lookup tables will also be a consideration to ensure practical operation and the right balance of complexity.

Because the player will not know exactly when the metamorphic symbols will reach an award state (e.g., a balloon symbol popping), but will have sense of the progress from the change of state of the metamorphic symbols (e.g., successively enlarging balloon symbol), the player is expected to have an increased sense of anticipation of win as progress continues.

In some embodiments, when metamorphic symbols land in a symbol position, they serve as payline blockers, such that there are no win combinations that may include the metamorphic symbols in a win, even where the metamorphic symbol lands on an otherwise winning payline. In other examples, when the metamorphic symbols 430 lands, the metamorphic symbols 430 may payout as a WILD or a SCATTER, which may involve lower win occurrences or a lesser number of lands.

In some examples, when the metamorphic symbols reach the award state (e.g., animated as a popped balloon symbol), the awarded values affect the symbols on the reels. By way of illustrative example, if the metamorphic symbol is a red balloon symbol (red shown as light shade in FIG. 4), it may award WILDS ×2, ×3, ×4, etc. And, when such red balloon 430C (red shown as light shade) of FIG. 4 reaches an award state (or pops), the animation or display sequence randomly distributes the number of WILDS won onto the reels. The distribution of WILDS could vary depending on parameters, such as the bet amount, that will animate movement of WILDS across the screen, which is sometimes referred to as a WILDS throw. WILDS may also be persistent or sticky. Such WILDS persist with each successive spin, or, in some examples, the persistence of the WILDS may continue until a counter decrements to zero, or could be coupled to the occurrence of a multiplier (e.g., 5×) such that the multiplier will yield that number of persistent WILDS for future spins (e.g., the WILDS will persist for 5 spins corresponding to the 5× multiplier, in this example). For example, the WILDS can be one or more sticky wilds that persist for the count shown on the symbol when awarded, i.e., there can be a single sticky wild that persists in the symbol location when awarded, or there can be sticky WILDS randomly distributed on the screen when awarded, that persist for the count shown, or each persist for a random number of spins.

If the metamorphic symbol is a blue balloon symbol (blue shown as dark shade), it may award multipliers, like 2×, 3×, 4×, etc. And, when such blue balloon, like the symbol 430D of FIG. 4, reaches an award state (e.g., popping of the blue balloon), the award animation or display sequence distributes or throws that many multipliers onto "random" symbols in the reel matrix 401, or the multiplier may stay in place and multiply any, e.g., symbol combination award on the payline that the blue balloon is on. The multiplier when awarded can be for the next spin, e.g., will multiply any line win, or the total award, of a subsequent reel spin outcome, etc.

And, when such green balloon (green shown as blank background), like the symbol 430E of FIG. 4, reaches an award state (e.g., popping of the green balloon), the award animation or display sequence randomly distributes or throws cash and/or jackpots onto the reels. In some examples, the value on the green balloon is directly related to the amount of the bet, e.g., in the example of FIG. 4, an award of 2× the bet or 200 credits. In other examples, multiple metamorphic symbols (e.g., red, blue green balloon symbols) may reach an award state at the same time and stack onto each other to increase the award available. In yet other examples, the metamorphic symbol may be transparent such that it does not reveal an award until the award state.

In some examples, as the metamorphic symbol grows, the award to be won may be gradually shown within the metamorphic symbol, e.g., the metamorphic symbol may become semi-transparent, potentially increasing as the metamorphic symbol grows, or may be shown only when the metamorphic symbol 430 reaches a predefined maximum size. When a metamorphic symbol reaches award state (e.g., a balloon symbol explodes), the processor 204 may determine to leave the metamorphic symbol in the same symbol position or transform the metamorphic symbol to a sub-symbol (e.g., the sets of stars 448 in the balloon symbols 430B, 430C, 430D as shown in FIG. 4).

Distribution of awards when the metamorphic symbol 430 reaches an award state may be a random or predetermined distribution. Additionally, multiple metamorphic symbols 430 may reach an award state at once and/or stack onto each to add to the potential award.

In some embodiments, the landing of a metamorphic symbol will result in the processor 204 determining the award from the facade look up table, if any. If an award is not returned, the façade lookup table may be re-weighted in view of the landing of the metamorphic symbol. For example, the re-weighting may accelerate (or decelerate or keep the same) the progress of the metamorphic symbol to reach an award state with each successive spin. Other weightings that enable an appropriate level of volatility to ensure a return-to-player may also be employed.

In yet other examples, the metamorphic symbol could be employed as part of a lottery draw, where the ticket drawn will lead to a weighted façade look up for the lottery ticket drawn, similar to the Class II examples disclosed herein.

FIGS. 5A-5F are examples of a game graphical user interface displaying examples of the metamorphic symbols 530 in the context of a portion of the graphical display 526 of the primary game display 240 or secondary game display 242. Such a graphical user interface is contemplated for Class II, Class III and remote gaming applications.

In some examples, a paytable of the bingo game may have one or more flags associated with one or more bingo game winning patterns, and a metamorphic symbol may be triggered to be presented when a player's bingo card (similar to bingo card 404 of FIG. 4) has a pattern that matches one of the flagged patterns. As another example, the metamorphic symbol may be presented by a winning bingo pattern with an award value and/or a priority higher (or lower) than a certain threshold. In some examples, the metamorphic symbol may appear when there are more than one (e.g., 2, 3, 4, 5, etc.) bingo game winning patterns. In various examples, the one or more bingo patterns that caused the display of the metamorphic symbol are predetermined from a set of possible bingo patterns.

The metamorphic symbol may be displayed and/or animated to display in one or more symbol positions of a reel matrix 501. In some examples, when the metamorphic symbol reaches an award state, it may be animated, emphasized, and/or highlighted (e.g., through fireworks, popping, explosions, color schemes, throbbing, shaking, bolding, etc.)

Additionally, the implementations disclosed improve over presenting the bingo game outcome as a combination of reel symbols. Instead, implementations disclosed herein present a bingo game outcome with a metamorphic symbol, where the player is directly informed of the changing state of the metamorphic symbol with each successive spin in a reel simulation game. As such, symbol animations through multiple reel spins may be eliminated, reduced or minimized since only symbol expansion and reel deformation animations are needed to match a bingo award and/or increment.

Figure 5A:
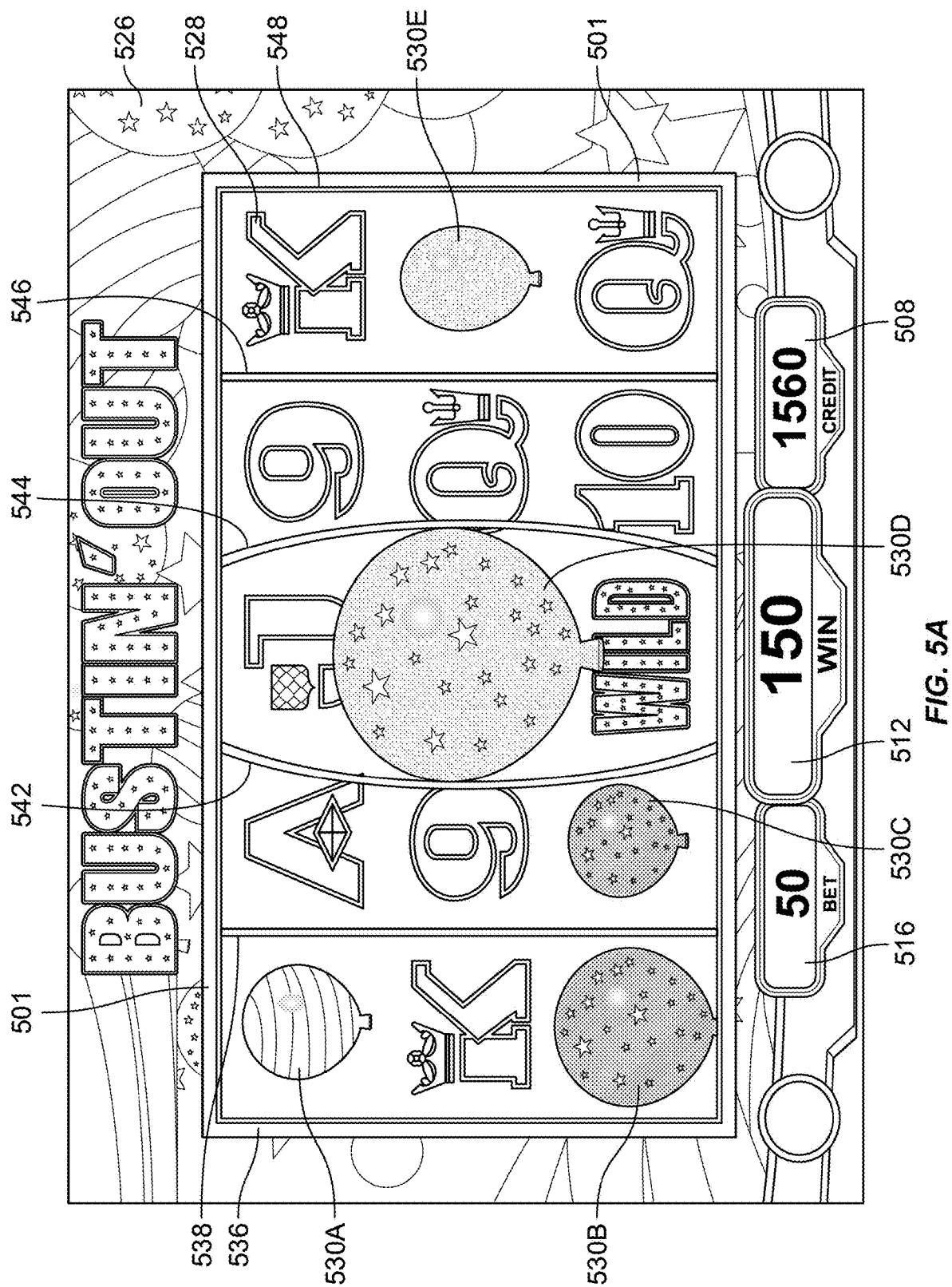
FIG. 5A-F examples of a graphical user interface displaying an expanded reel feature conducted based on a base game outcome.

For example, in FIG. 5A, metamorphic symbols 530A-E have landed in the reel matrix 501 following a spin. Metamorphic symbol 530A is a white striped (e.g., a mystery) balloon symbol, similar to that described above, and is in an initial state. Metamorphic symbols 530B and 530C are blue balloon symbols (blue shown as dark shade), although both are at different intermediate states toward an award state, where metamorphic symbol 530B is a further progressed intermediate state than metamorphic symbol 530C as indicated to the player by the increased size of the metamorphic symbol 530B and, in some embodiments, also by the increased number of stars shown. Neither metamorphic symbols 530B nor 530C have deformed reel walls 536, 538 or 542.

Metamorphic symbol 530D is a red balloon (red shown as light shade) representing WILDs, is at an intermediate state, and has additional sub-symbols or graphics (with stars similar to that of metamorphic symbols 530B and 530C), which indicating to the player that it is approaching an initial award state. Additionally, the player will appreciate that the metamorphic symbol 530D is in an intermediate state very close to the award state, because it has an increased size, while deforming the reel walls 542 and 544. Reel walls 542 and 544 deform to cover, overlay, or compress the adjacent reel and reel symbols. On successive spins, for example, metamorphic symbol 530D will continue to deform the reel walls 542 and 544 as the metamorphic symbol 530D spins through the successive symbol positions of that reel in the reel matrix 501.

Metamorphic symbol 530E is a red balloon (red shown as light shade) representing WILDs, is at an initial state, and has no additional sub-symbols or graphics (unlike the stars of metamorphic symbols 530B and 530C), which, with its initial smaller size, indicates to the player that it is at an initial award state. Metamorphic symbols 530E has not deformed reel walls 546 or 548.

In FIGS. 5B-5F, various states of different metamorphic symbols are displayed within a portion of the graphical display 526 of the primary game display 440. Similar or identical reference numerals in FIGS. 5B-5F are used to refer to similar or identical components in FIG. 5A, for example.

Figure 5B:
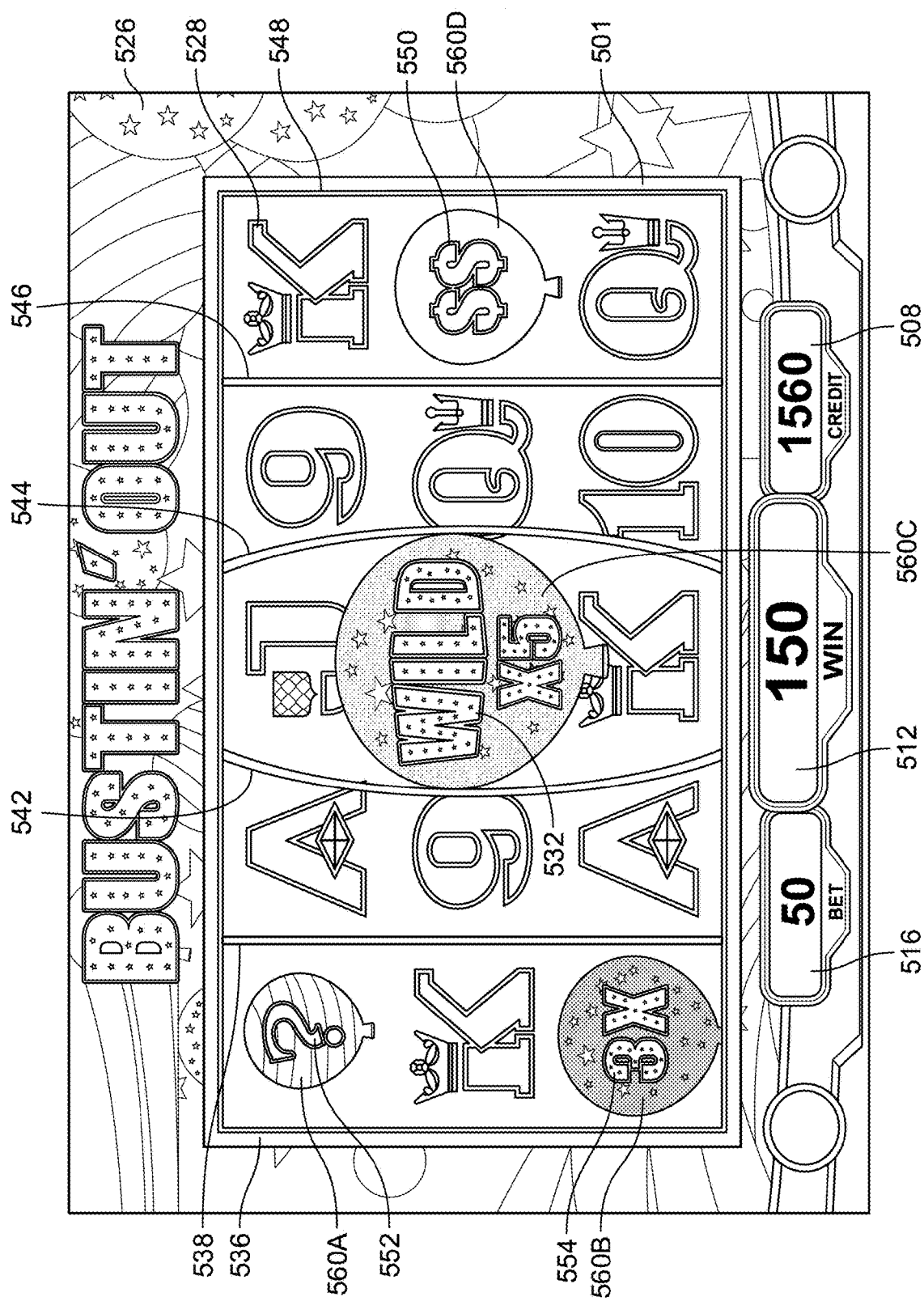

In the example of FIG. 5B, metamorphic symbol 560A has been displayed as a white balloon symbol with stripes as a symbol identifier, or a striped symbol identifier 552 that includes a "?" symbol to inform the player that metamorphic symbol 560A has a mystery status. In that same reel, metamorphic symbol 560B has been displayed with a multiplier as the symbol identifier, or a multiplier symbol identifier 554 (here, a "3×") to inform the player that the potential award is a 3× multiplier and it has reached an intermediate state as it has expanded in size, but still has not begun to deform the reel walls 536 or 538. In the middle reel, metamorphic symbol 560C has been displayed as a red balloon symbol (red shown as light shade) with a WILD, or a WILD symbol identifier 532 (here, a "WILD ×5") to inform the player that metamorphic symbol 560C has a WILD status that will distribute five WILDs (×5) if it reaches an award state, or the WILD symbol identifier 532 can be used to indicate that the metamorphic symbol 560C has reach the fifth intermediate state, for example. In the last reel, metamorphic symbol 560D has been displayed as a green balloon symbol (green shown as blank background) with a cash-on-reel (COR) as the symbol identifier or a cash-on-reel symbol identifier 550 (here, a "$$") to inform the player that the COR has reached an intermediate state as it has expanded in size, but still has not begun to deform the reel walls 546 or 548. The cash-on-reel (COR) symbol identifier 550 has a number of dollar signs to show that a potential COR award is higher for each dollar sign shown. In other examples, the cash-on-reel (COR) symbol identifier 550 may be an actual monetary amount, which may change with each successive spin or stay the same, depending on the implementation.

Figure 5C:
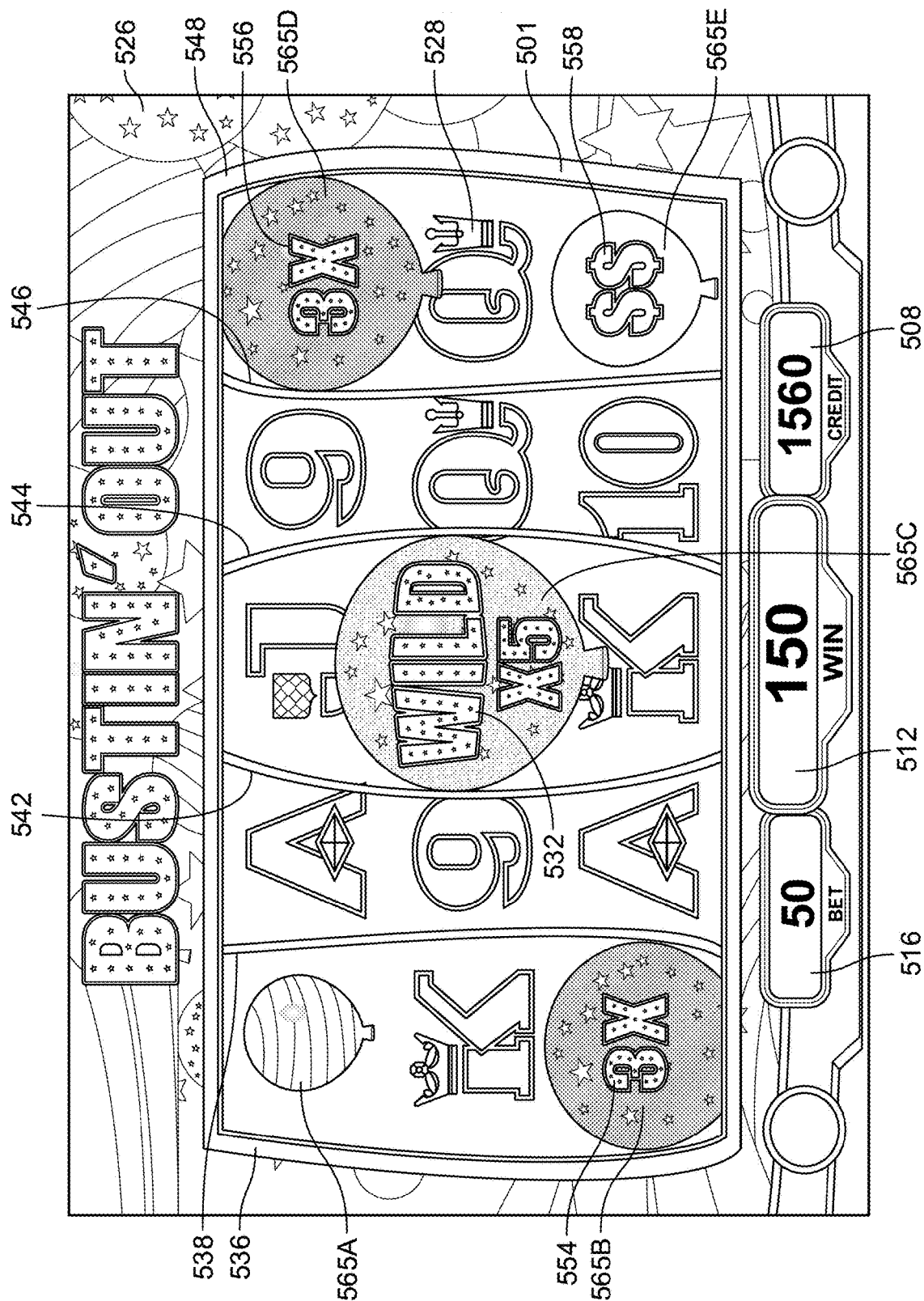

In the example of FIG. 5C, metamorphic symbol 565A has been displayed as a striped white balloon to inform the player that metamorphic symbol 565A has an as of yet undetermined mystery status, or it can inform the player the metamorphic symbol 565A has not reached an intermediate status yet (e.g., a "?" symbol might be added, like in FIG. 5B when a later intermediate state is reached). In that same reel, metamorphic symbol 565B has been displayed as a blue balloon symbol (blue shown as dark shade) with a multiplier symbol identifier 554 (here, a "3×") to inform the player that the potential award is a 3× multiplier, it has reached an intermediate state, and it has begun to deform the reel walls 536 and 538 progressing ever closer to an award state. In the middle reel, metamorphic symbol 565C has been displayed as a WILD symbol identifier 532 (here, a "5×") to inform the player that metamorphic symbol 565C has a WILD status that will distribute a WILD 5X multiplier if it reaches an award state, for example. Like the metamorphic symbol 565B, metamorphic symbol 565C has deformed the reel walls, here, reel walls 542 and 544, but has done so to a higher degree than metamorphic symbol 565B has to reel walls 536 and 538, because it is at a higher intermediate state than metamorphic symbol 565B, which also indicates metamorphic symbol 565C is closer to an award state. The deformation caused by the state of the metamorphic symbol 530C has caused the reel wall 542 and 546 to overlay, compress, or squeeze the adjacent reels of the reel matrix

401. In the last reel, like metamorphic symbol 565B, metamorphic symbol 565D has been displayed as a blue balloon symbol (blue shown as dark shade) with a multiplier symbol identifier 556 (here, a "3×") to inform the player that the potential award is a 3× multiplier, it has reached an intermediate state, and it has begun to deform the reel walls 546 and 548 progressing ever closer to an award state. Still in the last reel, metamorphic symbol 565E has been displayed as a green balloon symbol with a COR symbol identifier 558 (here, a "$$") to inform the player that the potential COR award is higher for each dollar sign shown and has reached an intermediate state, but has not begun to deform the reel walls 546 and 548.

Figure 5D:
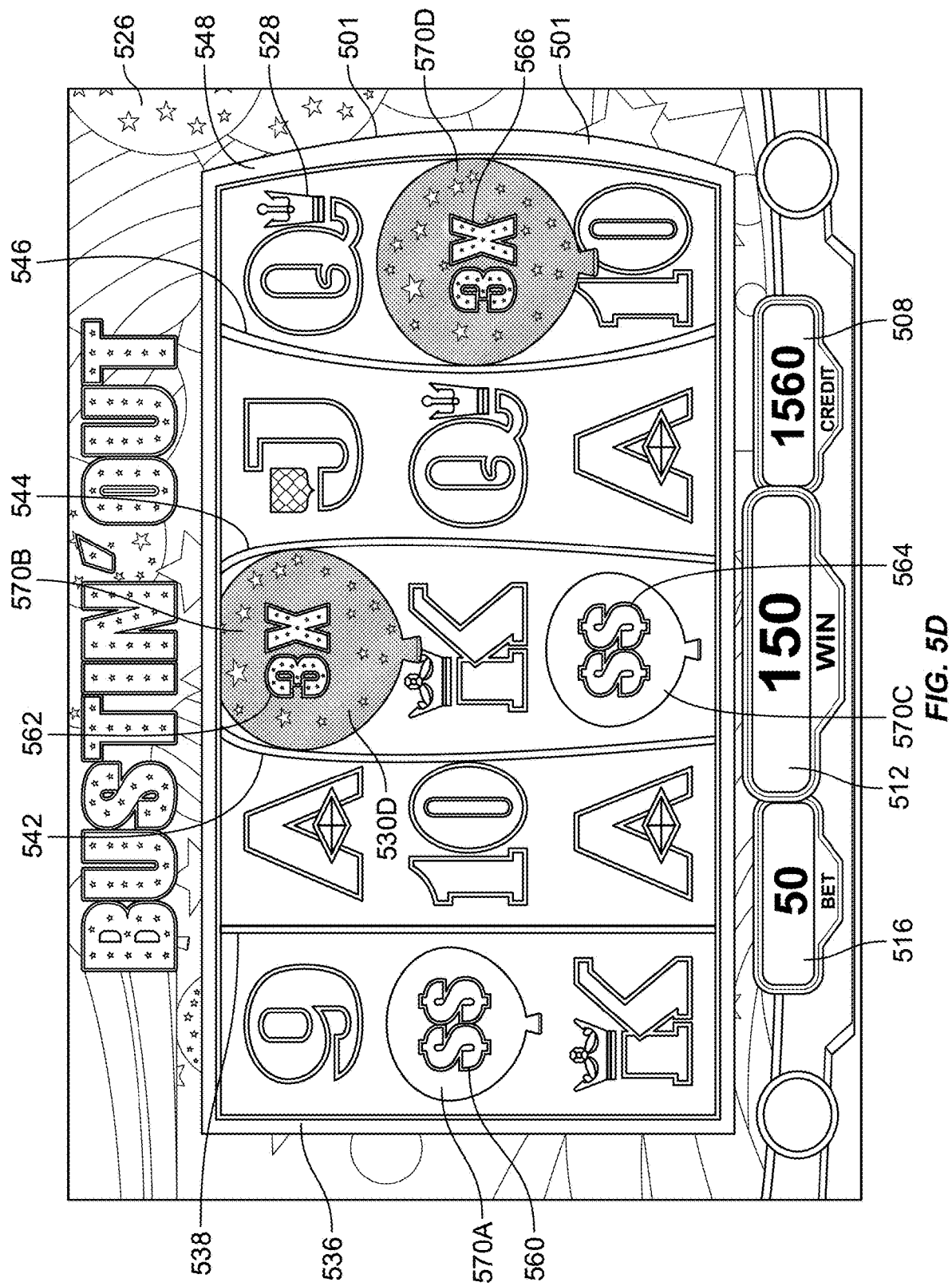

In the example of FIG. 5D, metamorphic symbol 570A has been displayed as a green balloon symbol (green shown as blank background) with a COR multiplier symbol identifier 560 (here, a "$$") to inform the player that the potential award is a COR symbol identifier that has reached an intermediate state, but it has not begun to deform the reel walls 536 and 538. In the middle reel, metamorphic symbol 570B has been displayed as a blue balloon symbol (blue shown as dark shade) with a multiplier symbol identifier 562 (here, a "3×") to inform the player that metamorphic symbol 570B has a multiplier intermediate status if it reaches an award state, for example. Metamorphic symbol 570B has deformed the reel walls, here, reel walls 542 and 544. The deformation caused by the state of the metamorphic symbol 570B has caused the reel wall 542 and 546 to overlay or compress the adjacent reels of the reel matrix 526. In the same reel as metamorphic symbol 570B, metamorphic symbol 570C has been displayed as a green balloon symbol (green shown as blank background) with a COR symbol identifier 564 (here, a "$$") to inform the player that the COR has reached an intermediate state as it has expanded in size that has reached an intermediate state, but has not begun to deform the reel walls 542 and 544. In the last reel, like metamorphic symbol 570B, metamorphic symbol 570D has been displayed as blue balloon symbol (blue shown as dark shade) with a multiplier symbol identifier 566 (here, a "3×") to inform the player that the potential award is a 3× multiplier, that has reached an intermediate state, and has begun to deform the reel walls 546 and 548 progressing ever closer to an award state.

Figure 5E:
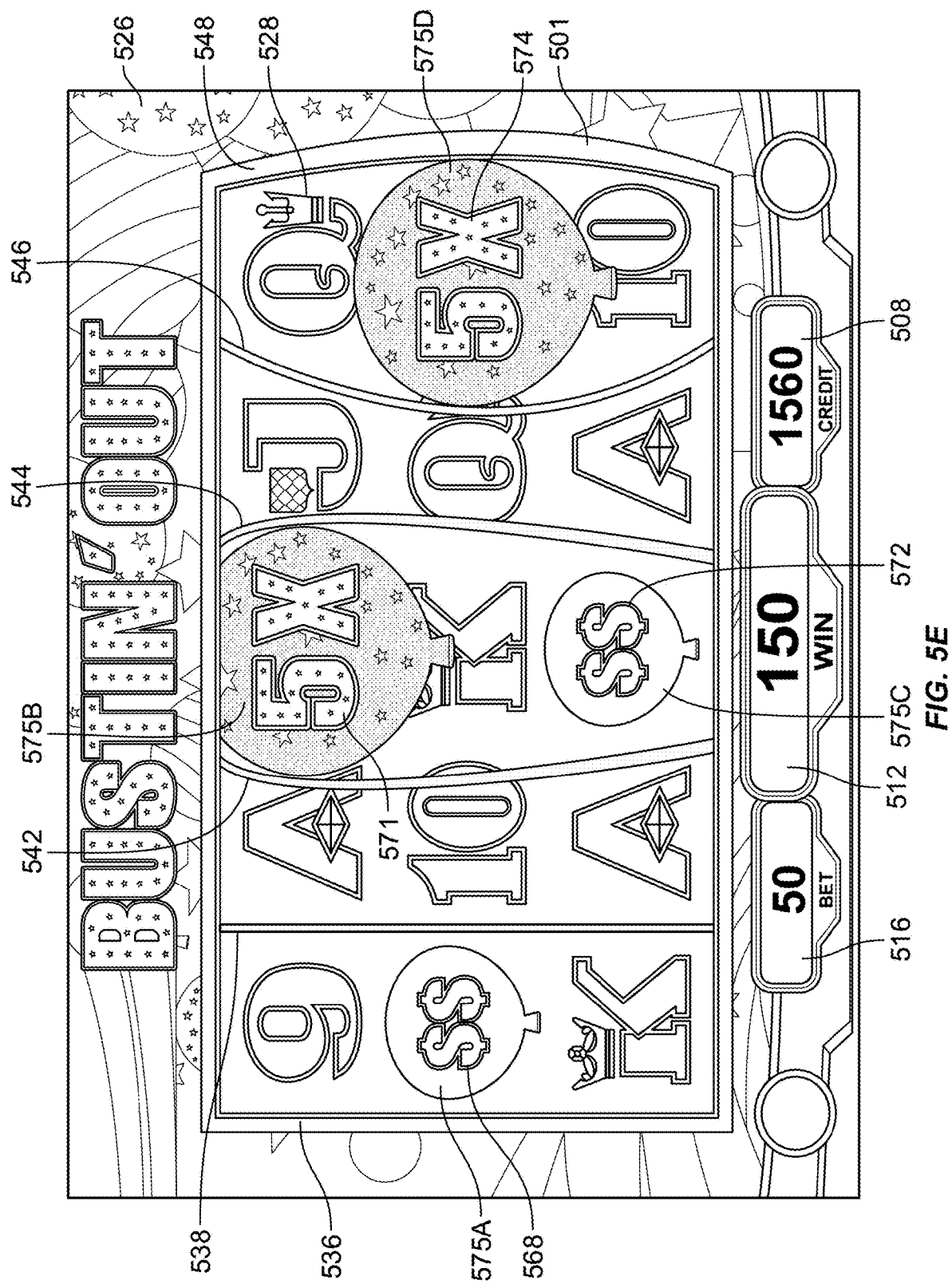

In the example of FIG. 5E, metamorphic symbol 575A has been displayed as a green balloon symbol (green shown as blank background) with a COR identifier 568 (here, a "$$") that has not begun to deform the reel walls 536 and 538. In the middle reel, metamorphic symbol 575B has been displayed as a red balloon symbol (red shown as light shade) with a WILD multiplier symbol identifier 571 (here, a "5×") to inform the player that metamorphic symbol 575B has a WILD status that will distribute a WILD 5X multiplier if it reaches an award state, for example. Metamorphic symbol 575B has reached an intermediate state, and has deformed the reel walls 536 and 538 to near the award state. Metamorphic symbol 575C has been displayed as a green balloon symbol (green shown as blank background) with a COR symbol identifier 572 (here, a "$$") to inform the player that the COR has reached an intermediate state as it has expanded in size that has reached an intermediate state, but it has not begun to deform the reel walls. In the last reel, metamorphic symbol 530D has been displayed as a red balloon symbol (red shown as light shade) with a WILD multiplier symbol identifier 574 (here, a "5×") to inform the player that metamorphic symbol 575D has a WILD status that will distribute a WILD 5X multiplier if it reaches an award state, for example, it has reached an intermediate state, and it has begun to deform the reel walls 546 and 548 progressing near an award state.

Figure 5F:
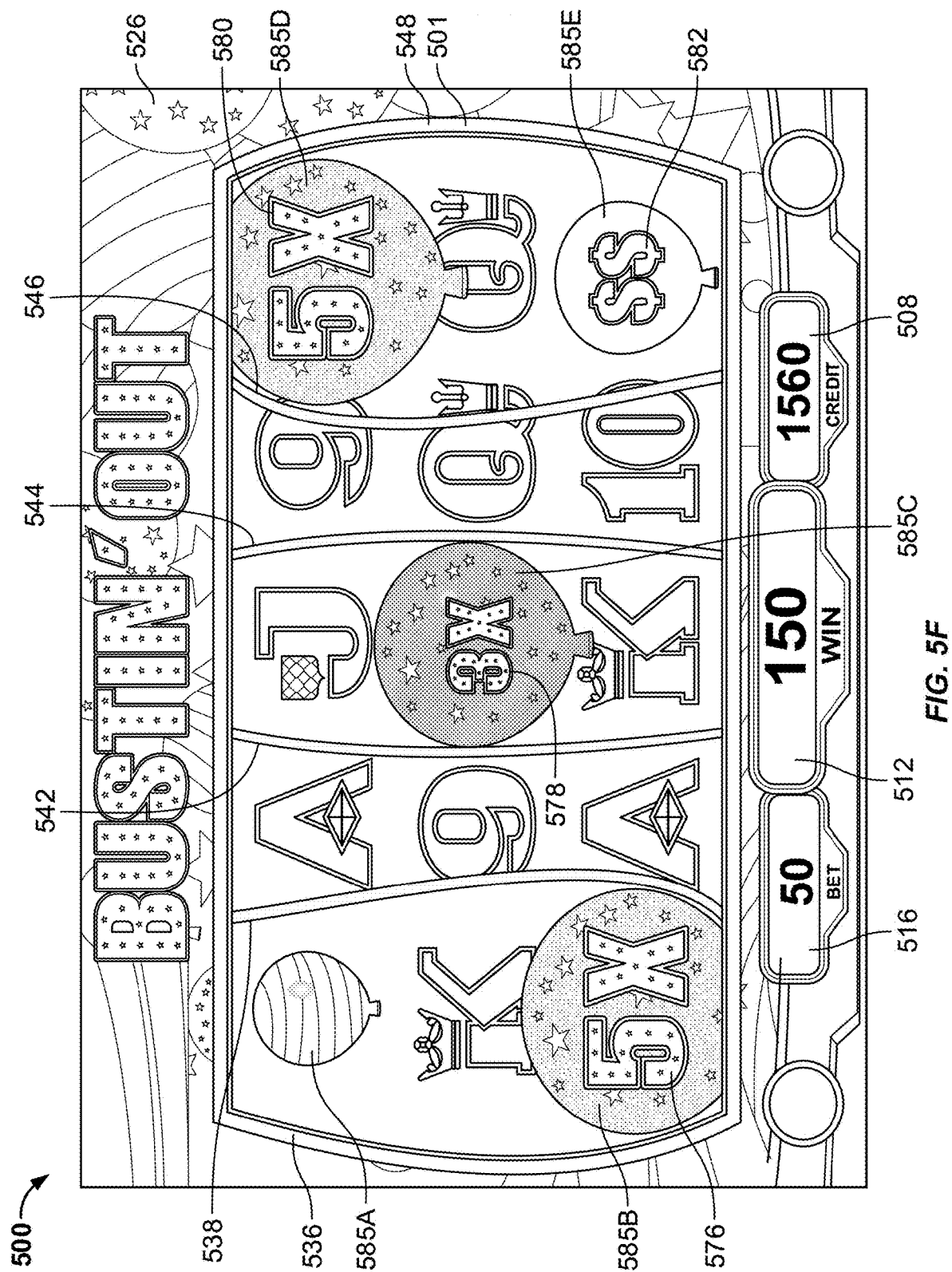

In the example of FIG. 5F, metamorphic symbol 585A has been displayed as a striped white balloon symbol to inform the player that metamorphic symbol 585A has a mystery status. In the same reel as metamorphic symbol 585A, metamorphic symbol 585B has been displayed as a red balloon symbol (red shown as light shade) with a WILD multiplier symbol identifier 576 (here, a "5×") to inform the player that metamorphic symbol 585B has a WILD status that will distribute a WILD 5X multiplier if it reaches an award state, for example. Metamorphic symbol 585B has reached an intermediate state, and has deformed the reel walls 536 and 538. Metamorphic symbol 585C has been displayed as a blue balloon (blue shown as dark shade) with a multiplier symbol identifier 578 (here, a "3×") to inform the player that the potential award is a 3× multiplier that has reached an intermediate state, and it has begun to deform the reel walls 542 and 544. In the last reel, metamorphic symbol 585D has been displayed as a red balloon symbol (red shown as light shade) with a WILD multiplier symbol identifier 580 (here, a "5×") to inform the player that metamorphic symbol 585D has a WILD status that will distribute a WILD 5X multiplier if it reaches an award state, for example, it has reached an intermediate state, and it has deformed the reel walls 546 and 548 progressing near an award state. In the same reel as metamorphic symbol 585D, metamorphic symbol 585E has been displayed as a green balloon symbol (green shown as blank background) with a COR identifier 582 (here, a "$$") to inform the player that the COR has reached an intermediate state as it has expanded in size that has reached an intermediate state, but it has not begun to deform the reel walls.

Figure 6:
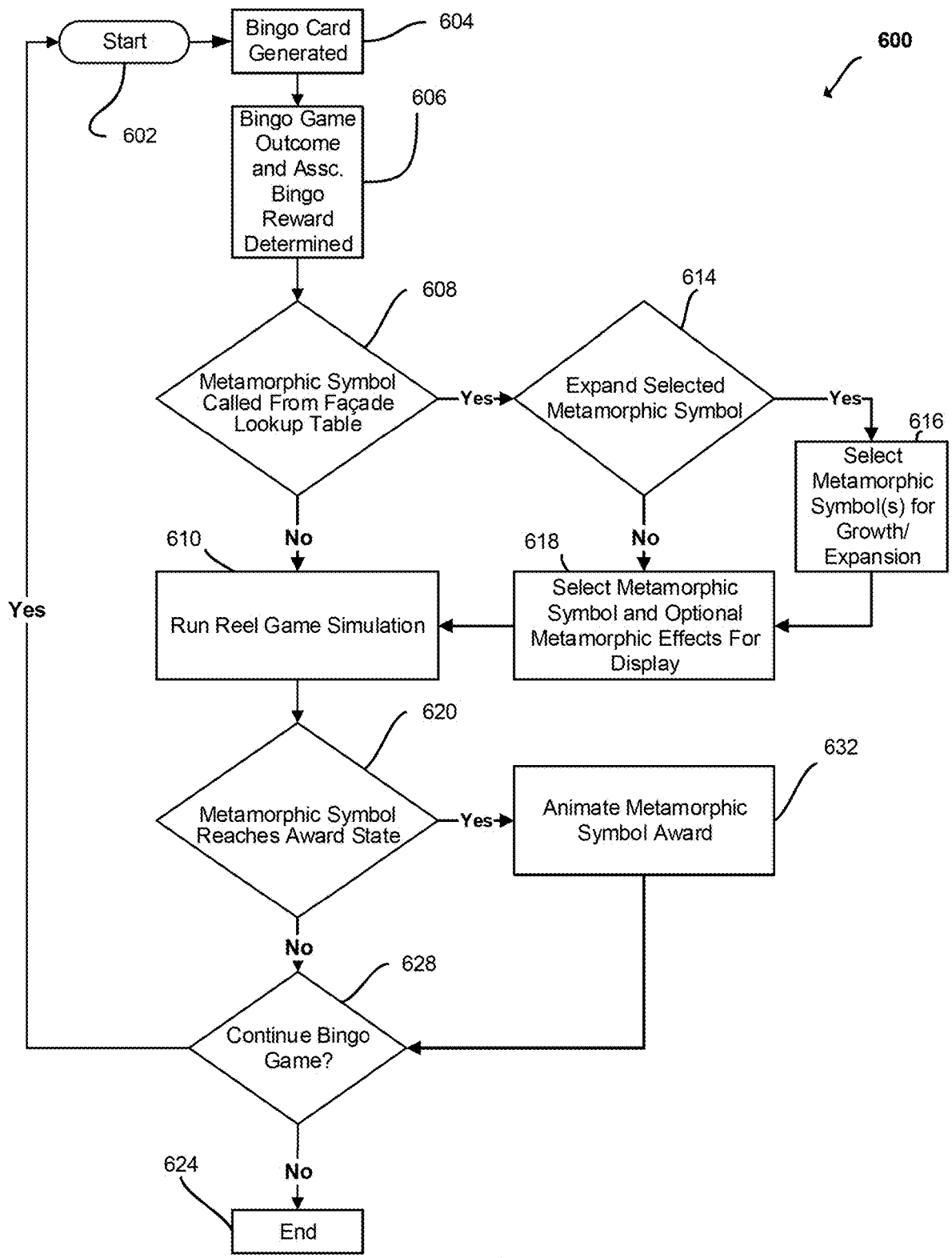
FIG. 6 is an exemplary control process that may be used to conduct the Class II game employing a metamorphic symbol growth to expanded reels during the conduct of a base game outcome.
Figure 7:
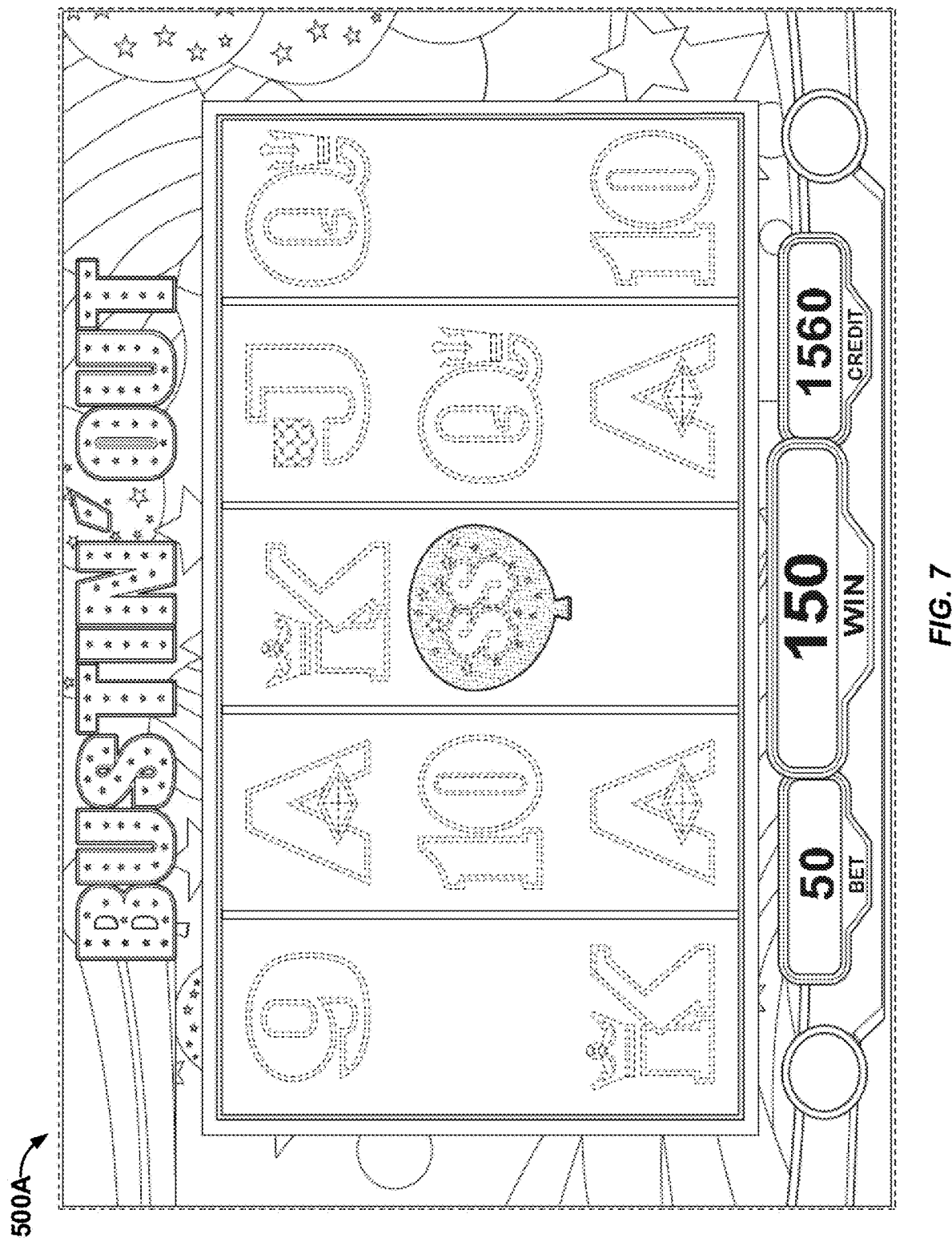
FIGS. 7-21 represent ornamental aspects of the EGM, and not functional features. Those ornamental aspects do not form a part of the claimed invention.
Figure 8:
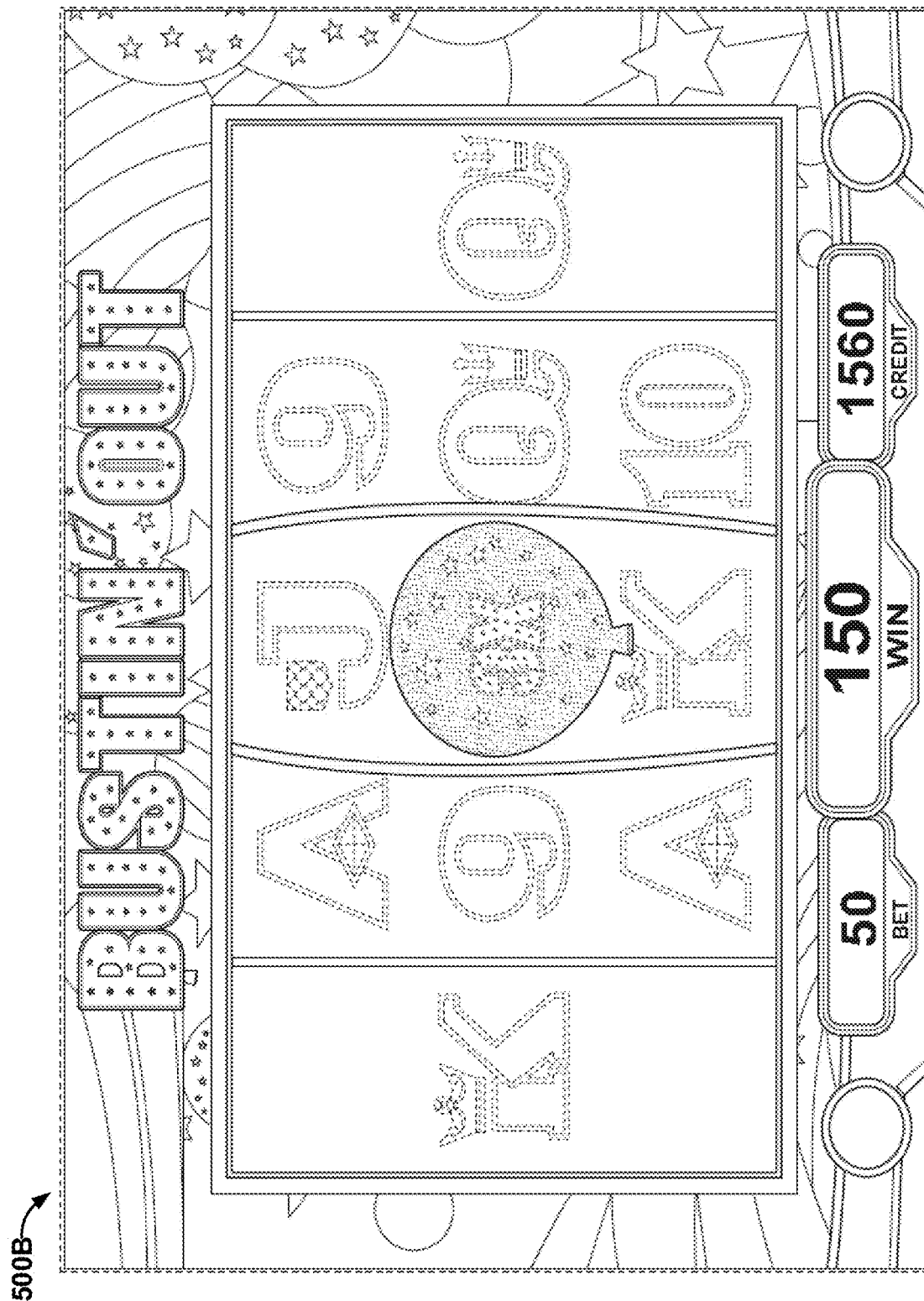
Figure 9:
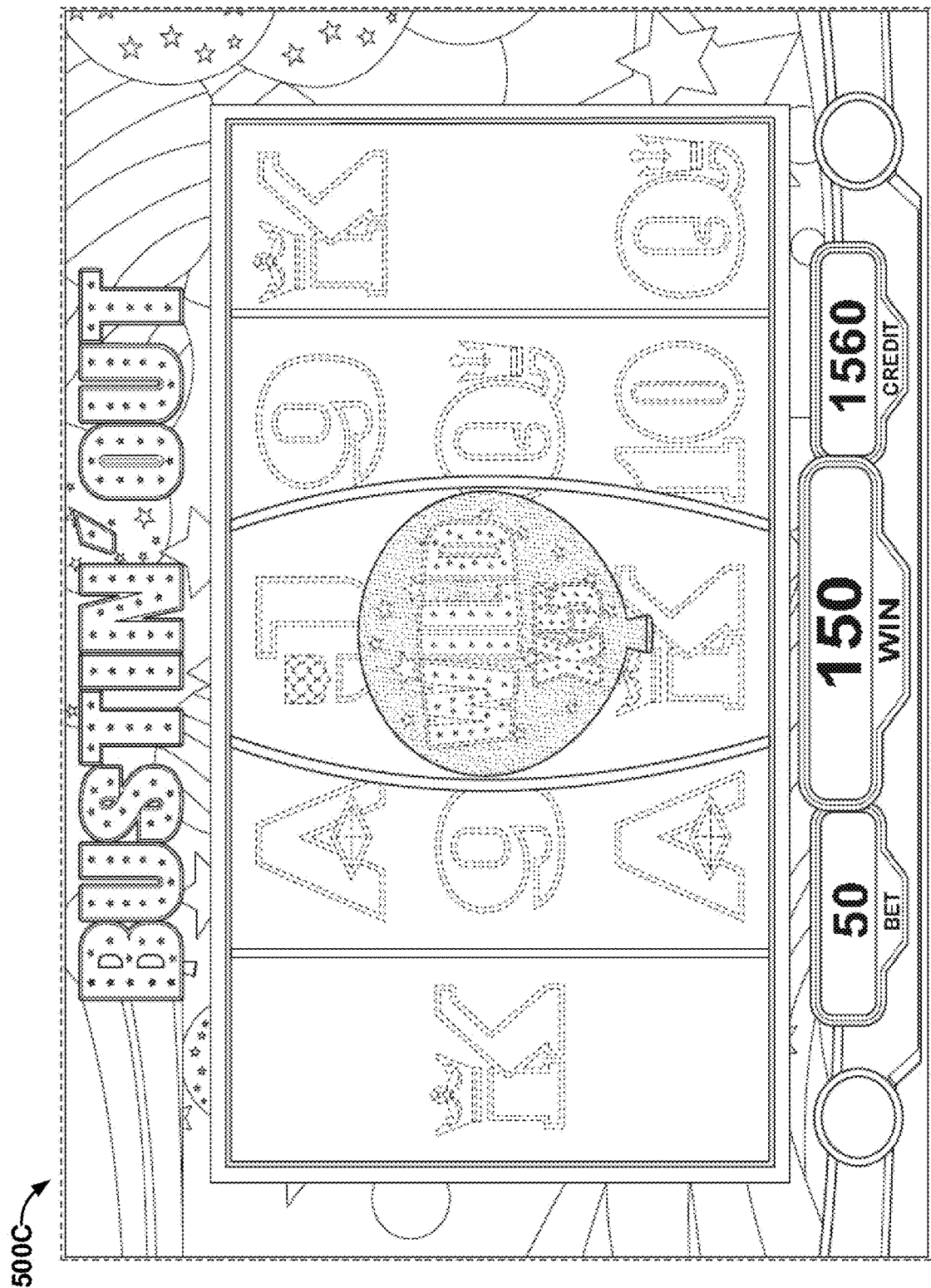
Figure 10:
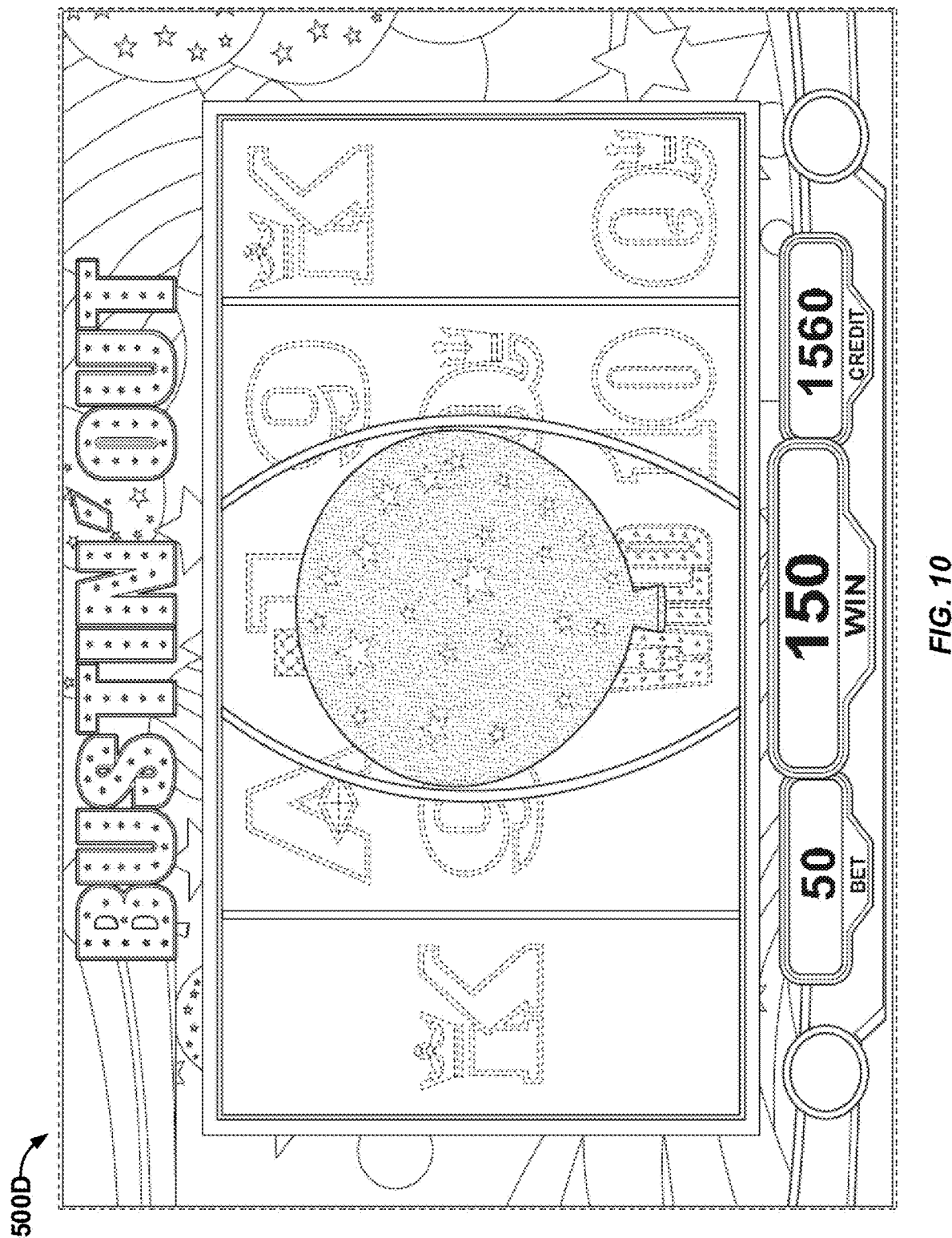
Figure 11:
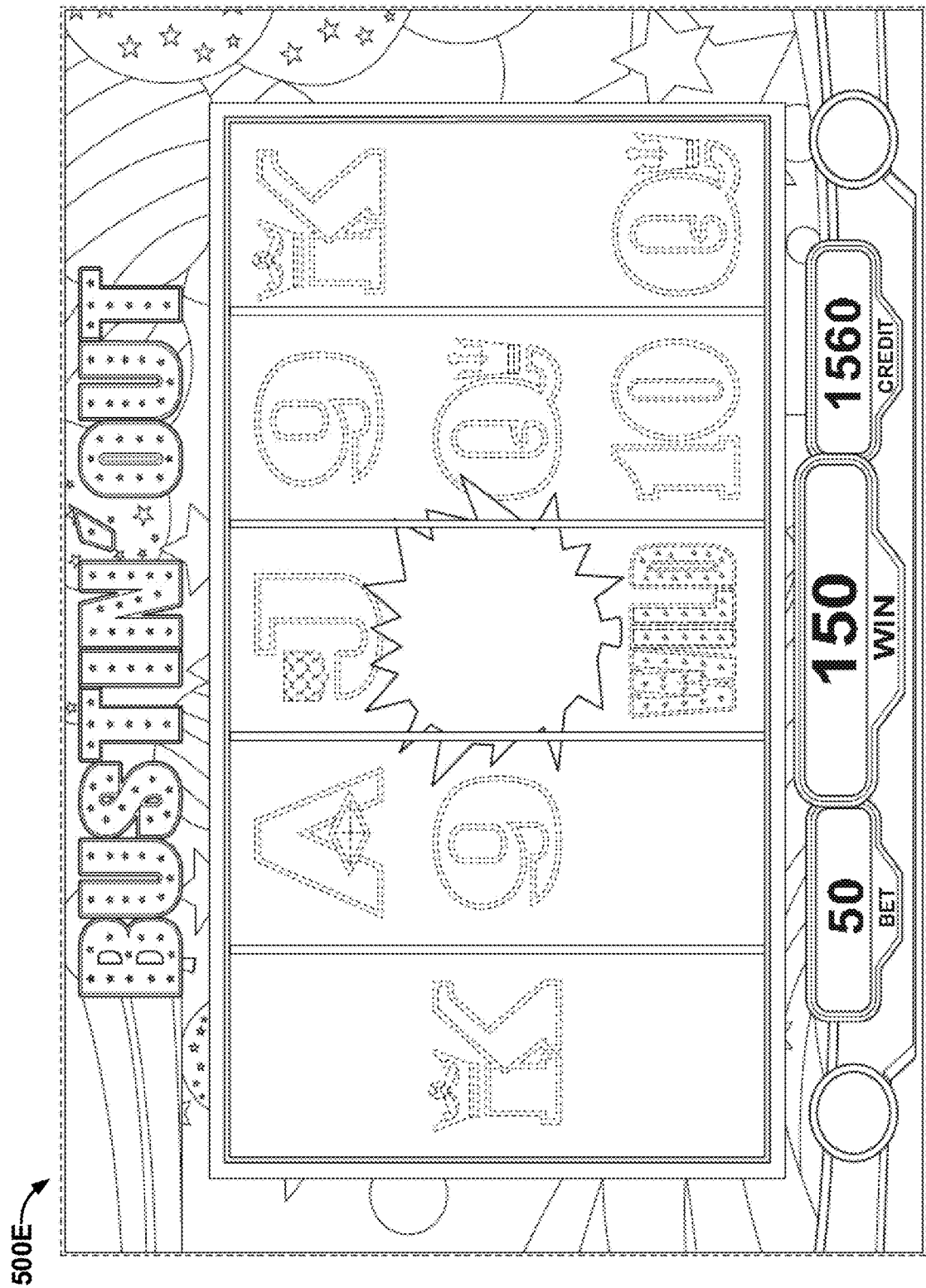
Figure 12:
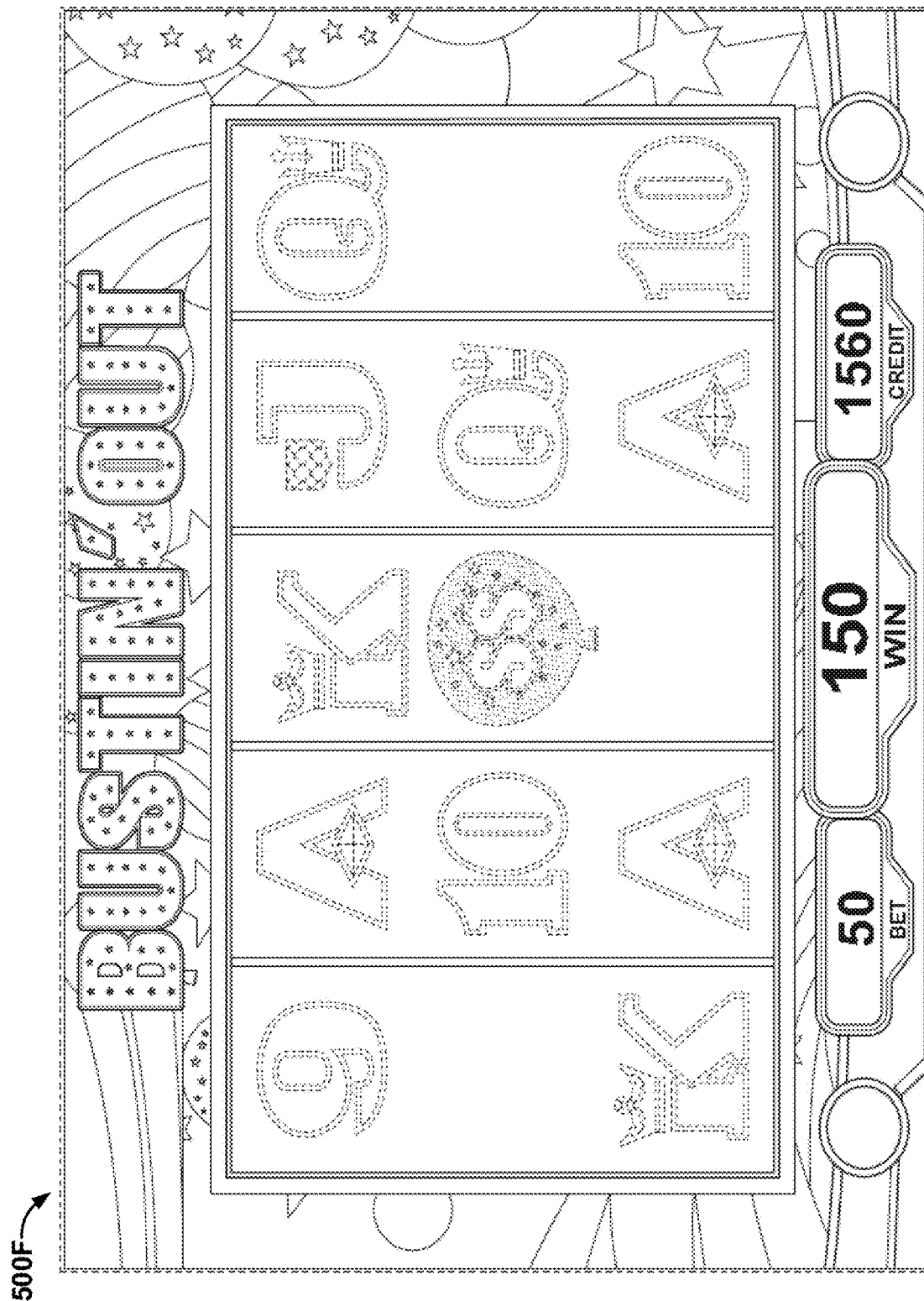
Figure 13:
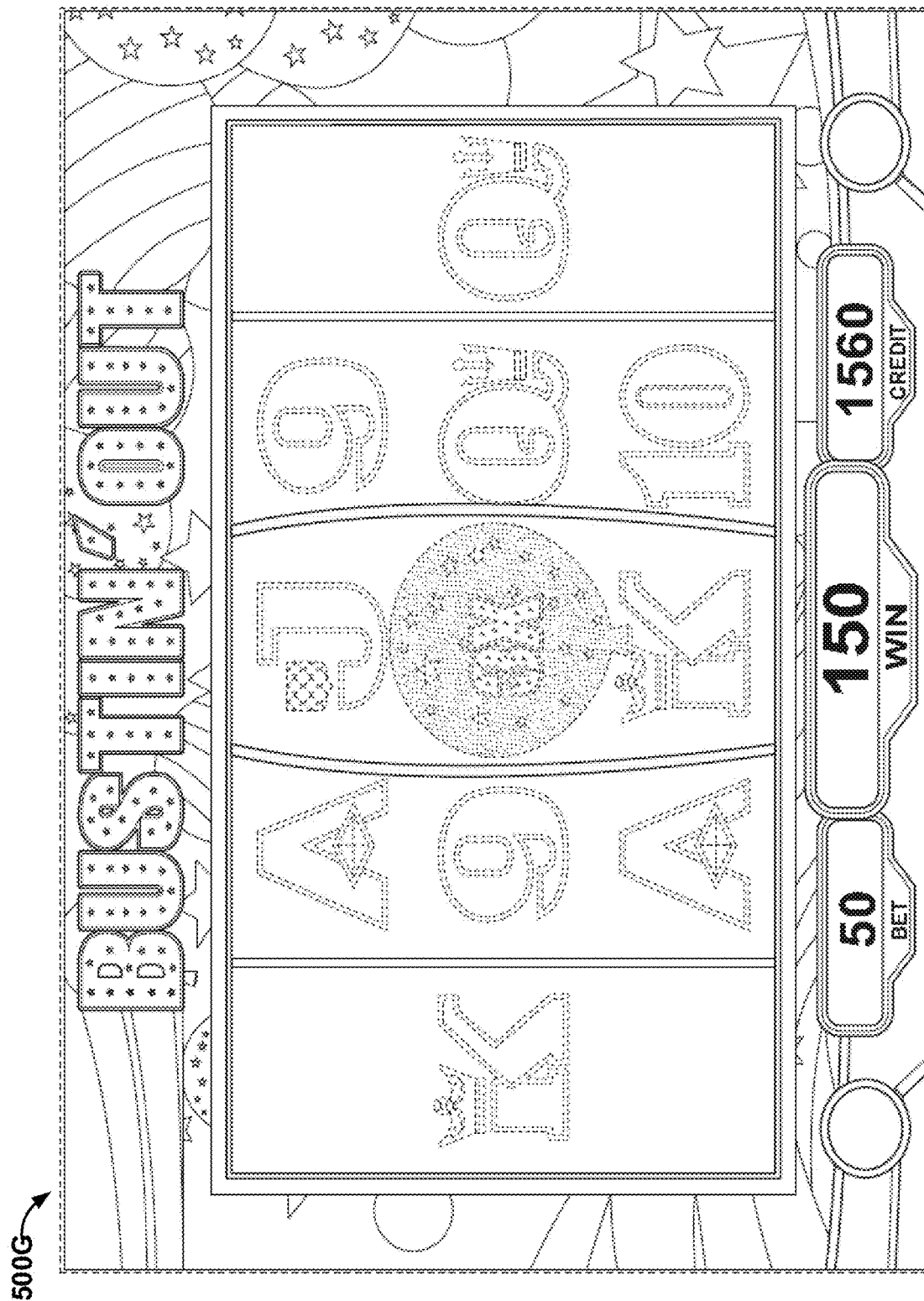
Figure 14:
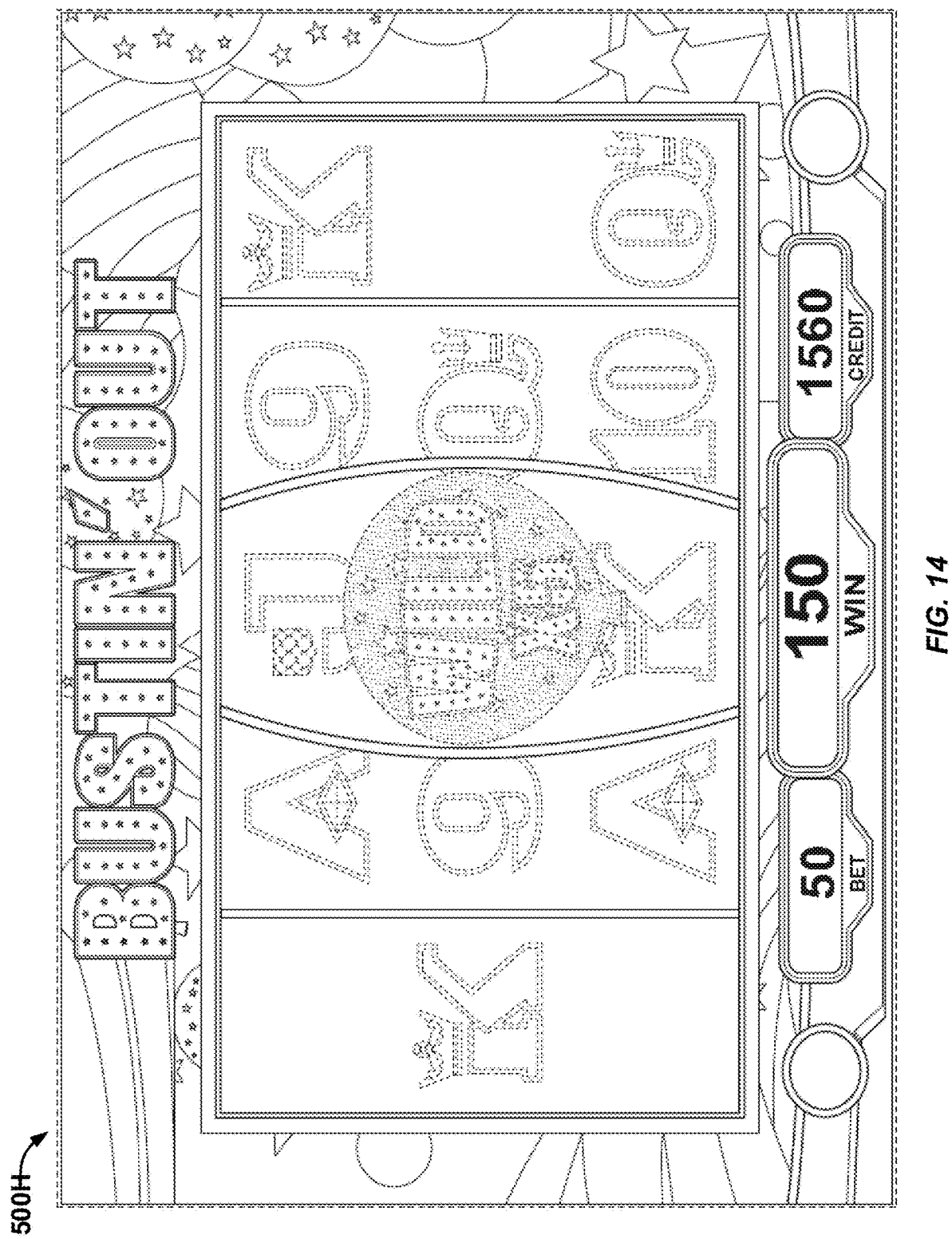
Figure 15:
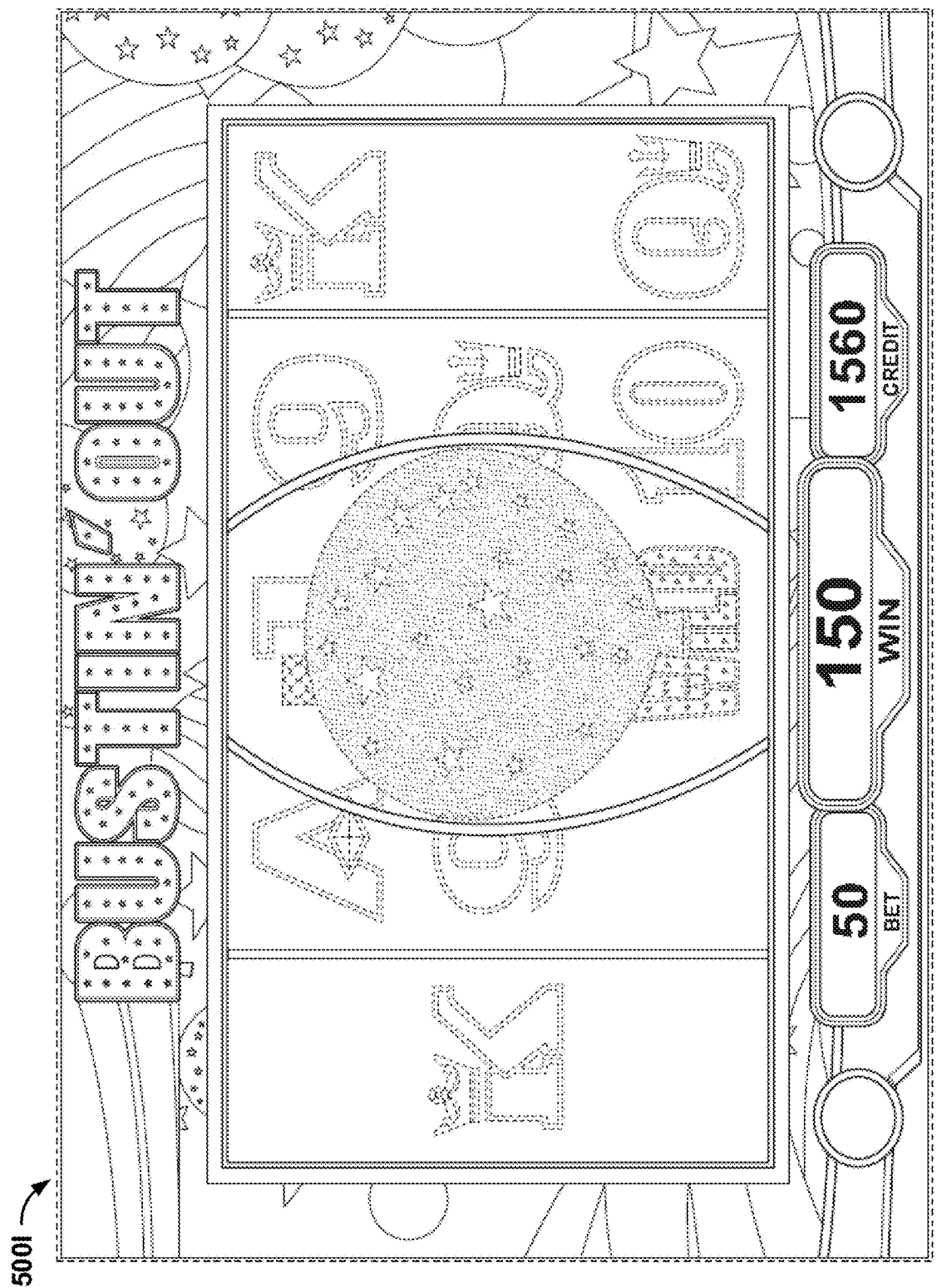
Figure 16:
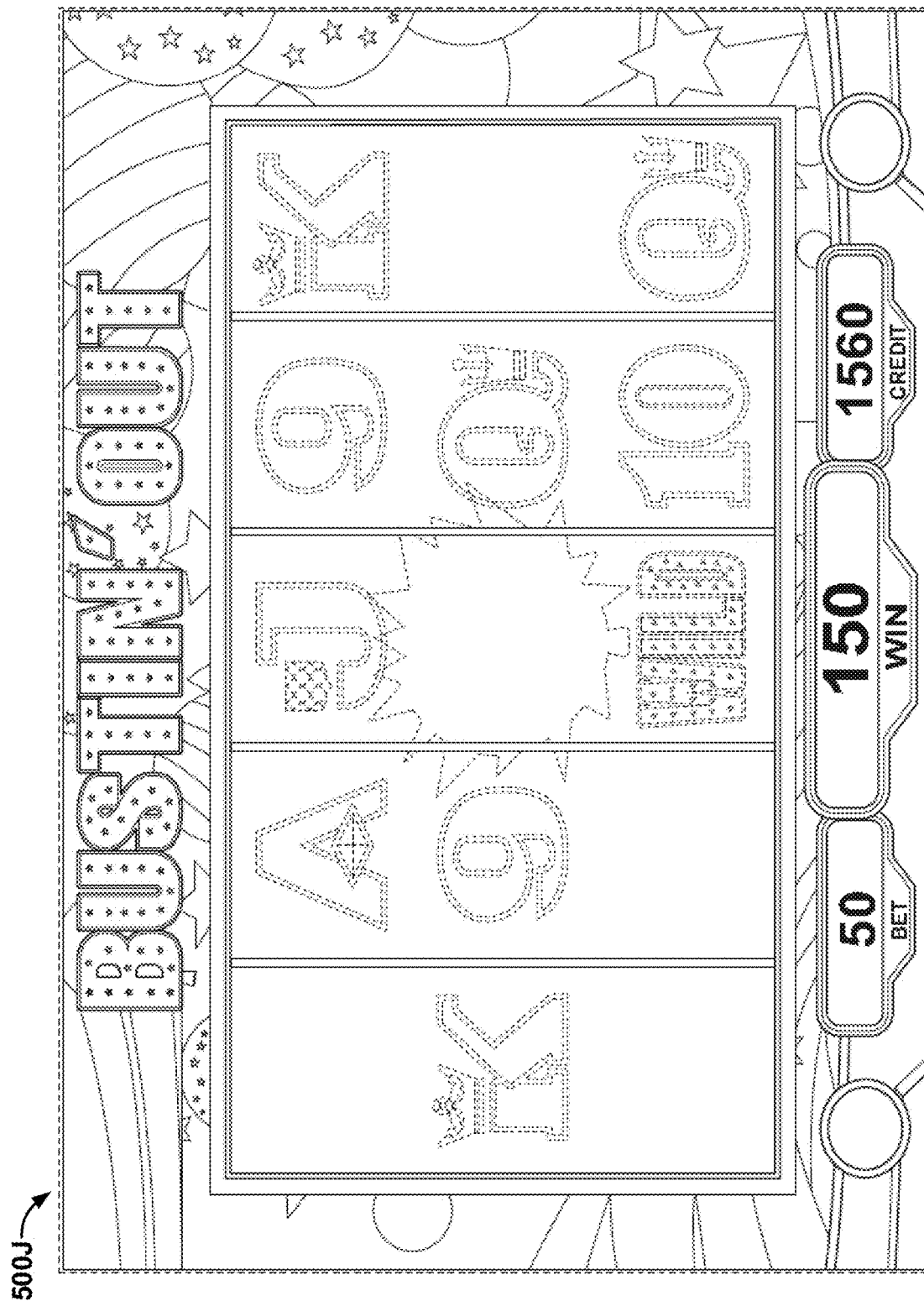
Figure 17:
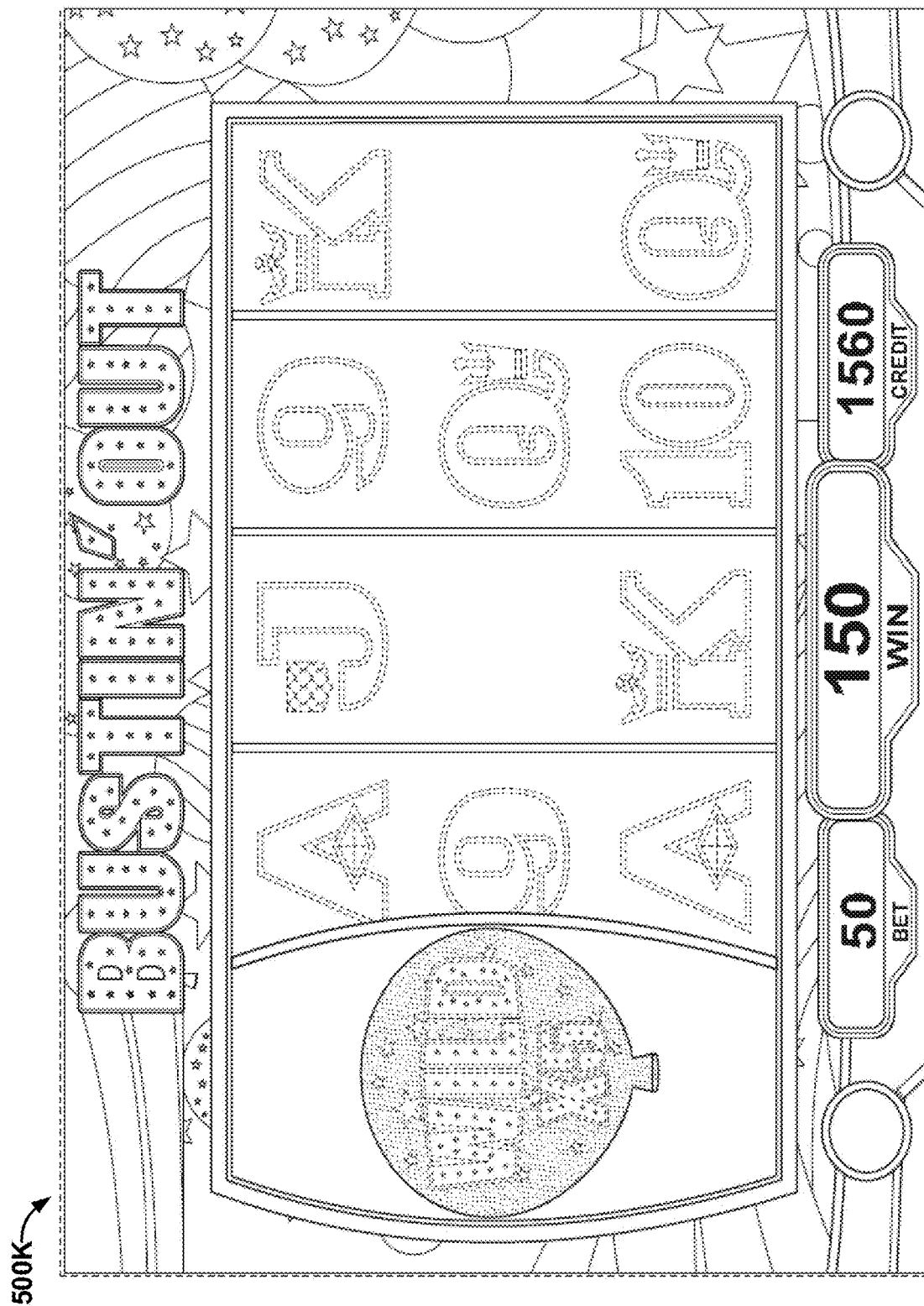
Figure 18:
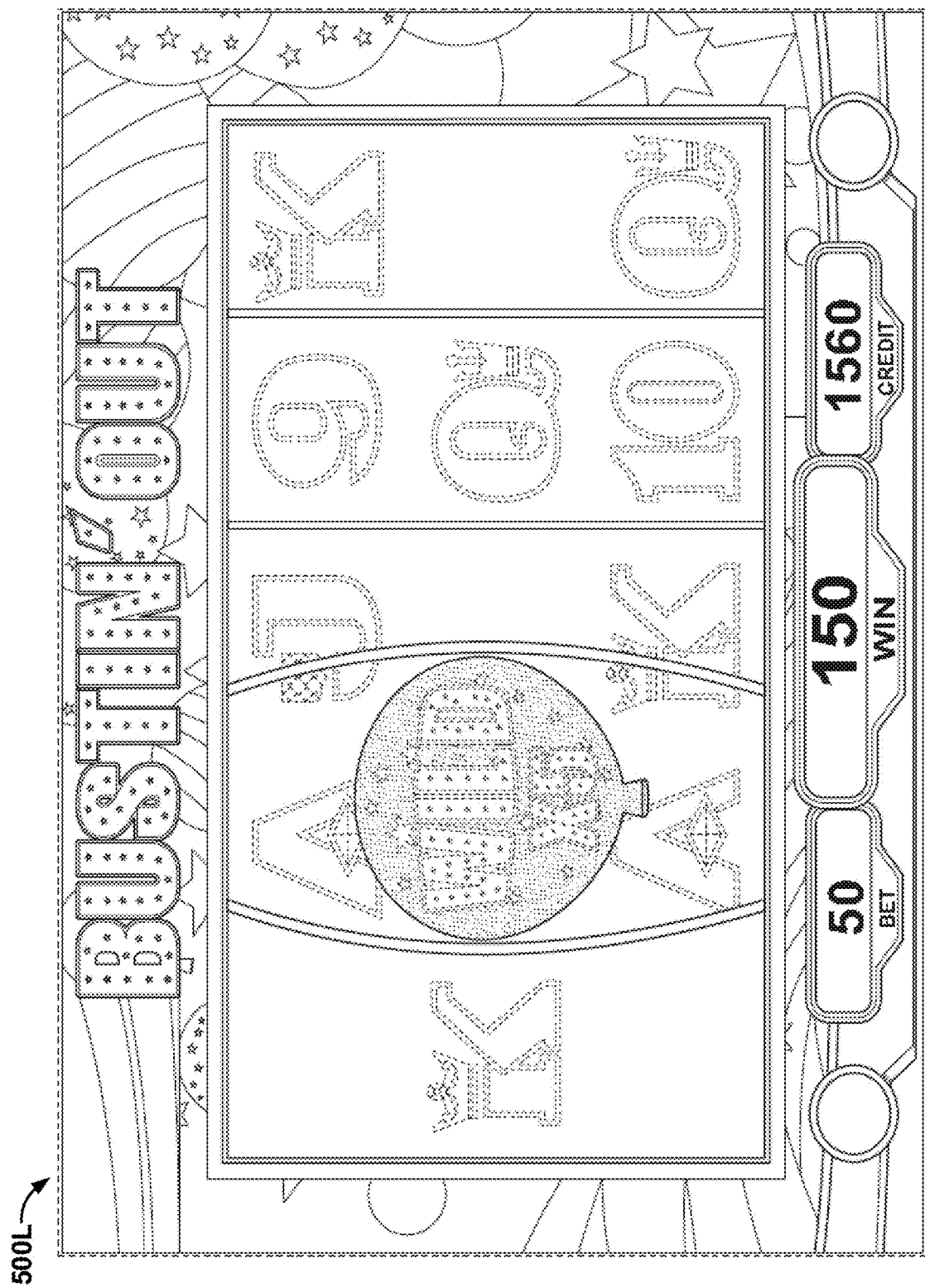
Figure 19:
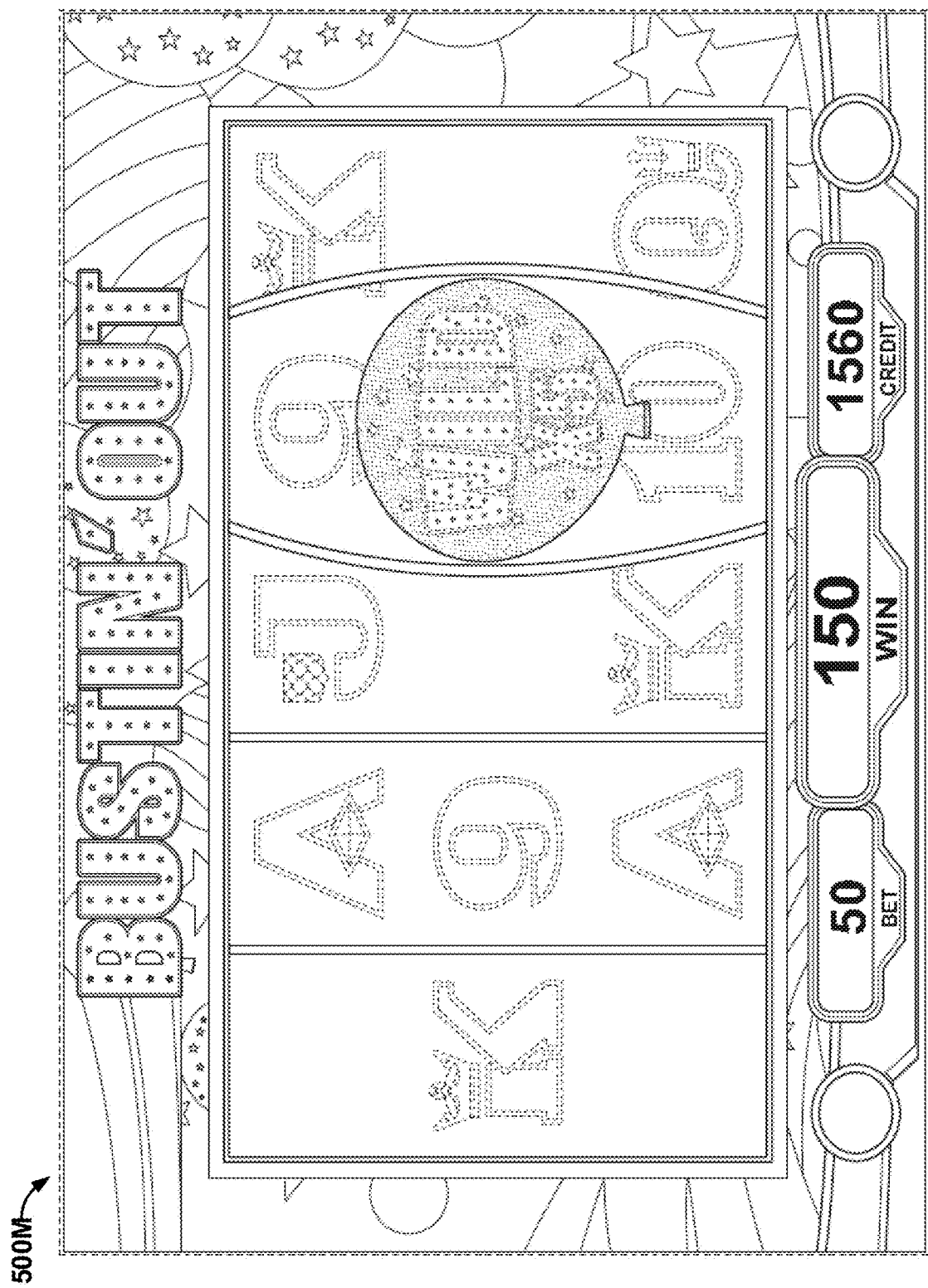
Figure 20:
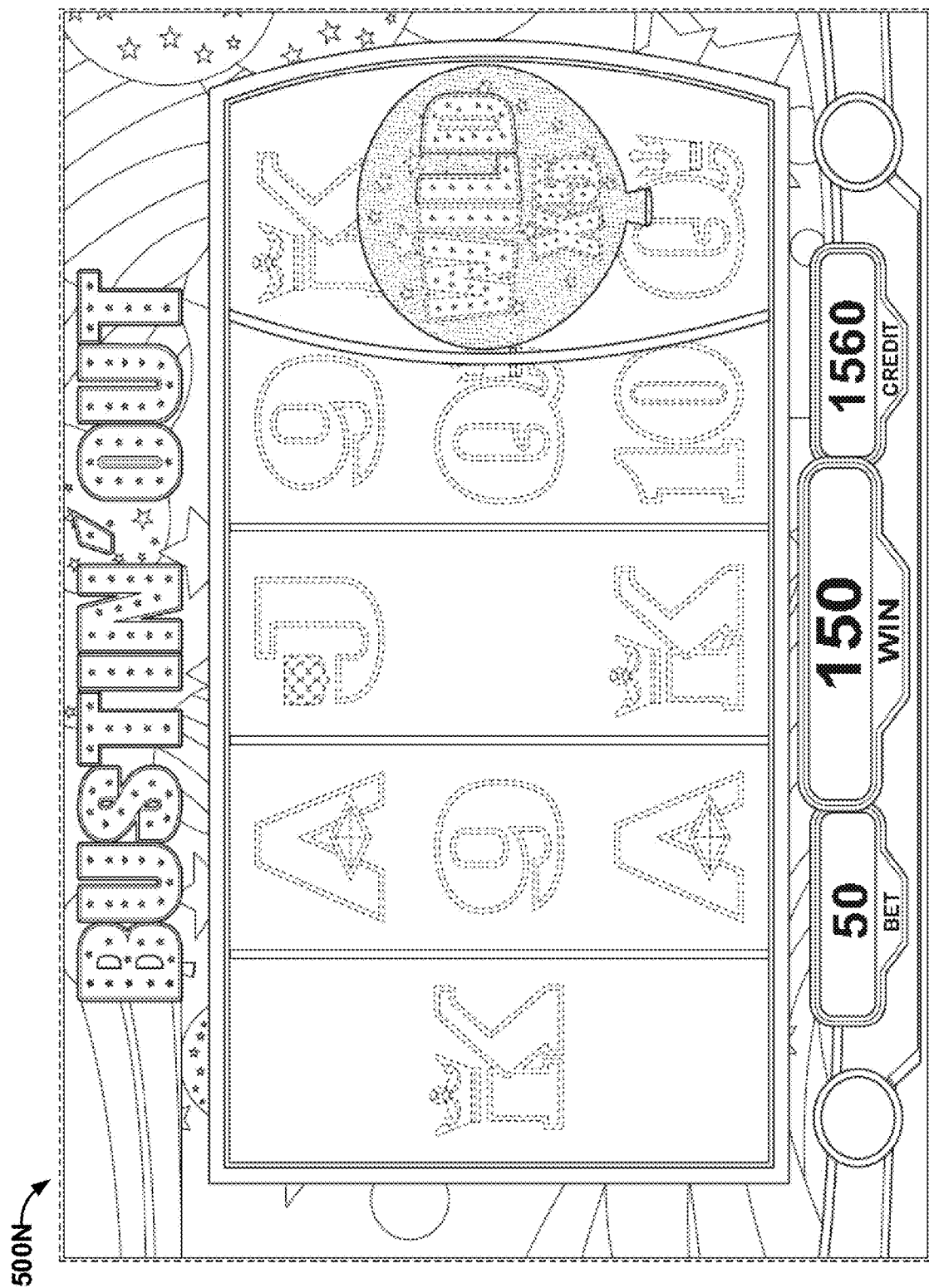
Figure 21:
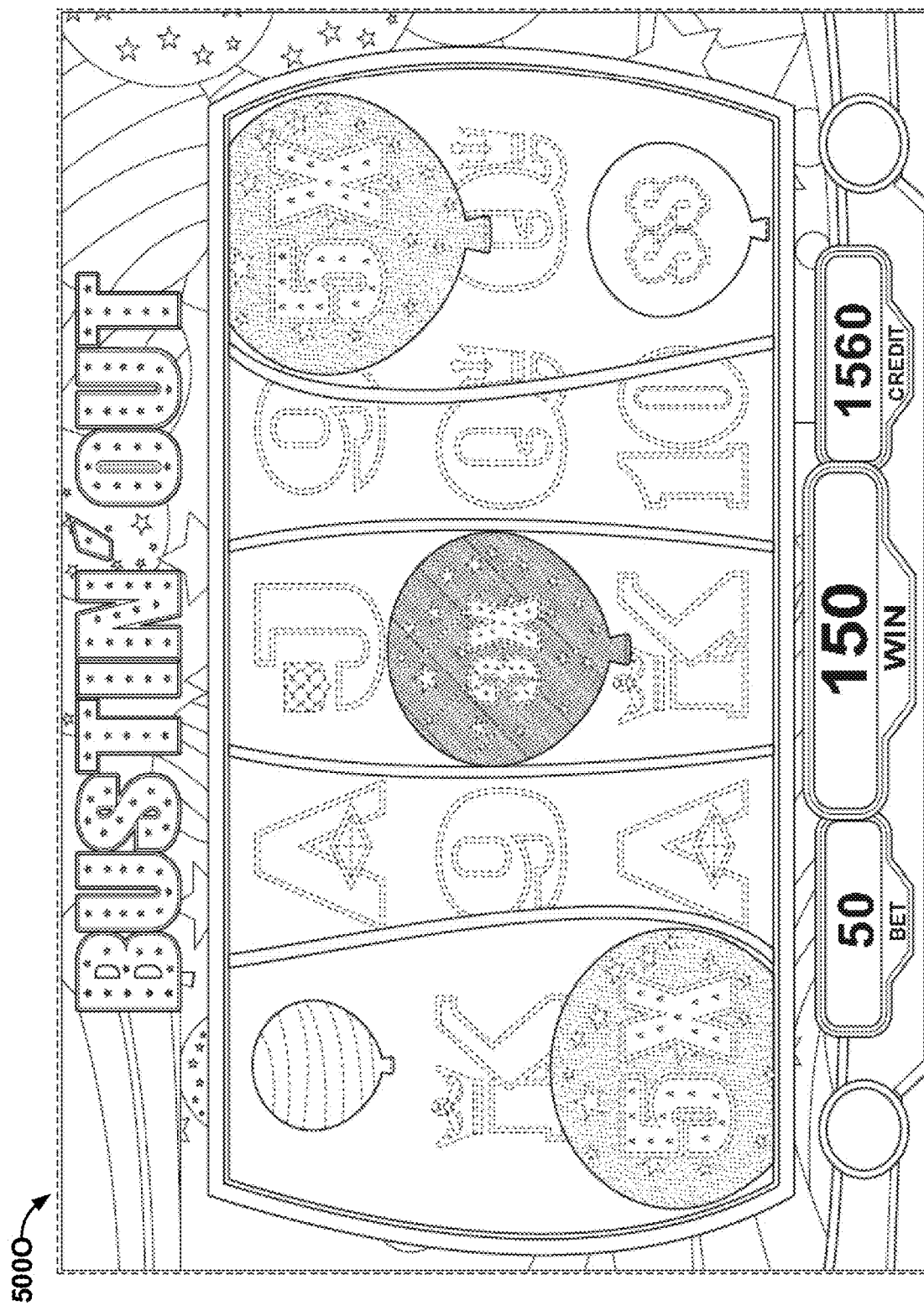

FIG. 6 is a flow chart illustrating an example control process 600 of the system 100. In some examples, some or all of control process 600 may be implemented via the bingo server 107. In some examples, some or all of control process 600 may be implemented via an EGM 200. In some examples, some or all of control process 600 may be implemented in analog and/or discrete circuitry. In some examples, some or all of the control process 600 may be implemented in machine readable instructions stored in memory (e.g., memory 208) and/or executed by one or more processors (e.g., processor(s) 204 of FIG. 2). In some examples, some or all of the control process 600 may be implemented via program 206. In some examples, the control process 600 may be implemented via a combination of the bingo server 107, EGM 200, analog and/or discrete circuitry, memory, and program 206.

In the example of FIG. 6, the control process 600 begins at block 602, where a bingo game starts. In some examples, the bingo game may begin when a player makes a wager (e.g., via the user interface) and/or when a player initiates the game through some activation (e.g., pressing a "Spin" or "Play" button 422 on the user interface). At block 604, a bingo card 404 is received, retrieved, or generated by an EGM 200. In some examples, the bingo server 107 may generate and/or provide the bingo card 404 to the EGM 200, as discussed above. In some examples, the EGM 200 may generate the bingo card 404, as discussed above. In some examples, EGM 200 may retrieve a bingo card 404 from its memory 208 where a number of bingo cards 404 are stored. The retrieved bingo card 404 may be then removed from memory 208. Once the number of bingo cards stored in memory falls below a threshold amount, additional bingo cards are either received from bingo server 107 or generated by EGM 200.

In the example of FIG. 6, one or more bingo outcomes are determined at block 606. In some examples, determining the bingo game outcome(s) may comprise a comparison (e.g., via the bingo server 107 and/or EGM 200) of the numbered cells 402 on the bingo card 404 with a bingo number listing 406 (a bingo ball call), which may be generated by the bingo server 107. The comparison may be conducted by the bingo server 107 and/or the EGM 200 to determine which, if any, numbered cells of the bingo card 404 match numbers in the bingo number listing 406. The bingo server 107 and/or EGM 200 may then determine whether one or more patterns formed by the matched numbered cells of the bingo card 404 correspond to one or more patterns in an associated bingo game paytable. If the one or more patterns formed by the matched numbered cells of the bingo card 404 correspond to one or more patterns in the associated bingo game paytable, one or more winning bingo game outcomes are determined or messaged, such that each winning bingo game outcome is associated (e.g., via the paytable) with an award. If the one or more patterns formed by the matched numbered cells of the bingo card 404 do not correspond to one or more patterns in the associated bingo game paytable, a losing bingo game outcome is determined or messaged. In some other examples, the bingo server 107 and/or EGM 200 may only message or determine a winning bingo game outcome.

At block 608, the bingo server 107 and/or EGM 200 determines whether a metamorphic symbol is to be displayed from a call to the façade lookup table. The façade lookup table could include varied weightings for a selection of metamorphic symbols depending on where in the reel matrix 401 the metamorphic symbol is to land, the size of the wager, the state of the metamorphic symbol when selected, among others. In some examples, the metamorphic symbol may be called for display based upon the number of bingo game winning outcomes, whether one or more winning bingo patterns correspond to one or more flags in the bingo game paytable, a priority of the one or more winning bingo patterns in the bingo game paytable, and/or other considerations, as discussed above. The metamorphic symbol may be called for display based on an outcome (e.g., an appearance of a symbol) in a reel of the reel game simulation.

As shown, if the metamorphic symbol is not called for display (e.g., there are no or too few winning bingo game outcomes, and/or no or too few feature flags or priority outcomes), that is, the "No" path of block 608, the control process 600 proceeds to run the reel game simulation 610.

Referring still to FIG. 6, in block 610, the bingo outcome(s) (and/or associated award(s)) determined at block 606 are then presented to the player via a typical reel game simulation. In some examples, the bingo server 107 and/or EGM 200 may determine and display at block 610 a winning combination of symbols in the spinning reel game that awards the award determined in block 606.

If one or more metamorphic symbols is called for display, that is, the "Yes" path of block 608, the control process 600 proceeds to block 614 where the game controller 202 determines whether to expand the one or more metamorphic symbols that are called for display and/or animated expansion. If the "No" path is determined, the one or more metamorphic symbols is displayed, at step 618, with any optional graphical sub-symbols (e.g., stars), lighting effects, sound effects, vibration or other effects corresponding to the metamorphic symbol 430 selected, and the control process 600 continues to run the reel game simulation 610.

If the "Yes" path at step 614 is determined, the one or more metamorphic symbols are selected for animation, at step 616, in an enlarged or grown state in relation to an initial or intermediate state of the metamorphic symbol(s) previously presented, when called for display. The one or more metamorphic symbols are selected for display, at step 618, with any optional graphical sub-symbols (e.g., stars), lighting effects, sound effects, vibration or other effects corresponding to the metamorphic symbol selected in an expanded state from step 616, and the process 600 continues to run the reel game simulation at block 610. In some embodiments, the reel game simulation at block 610 may also include an animation of expanding one or more of the metamorphic symbols, and deforming of the reel walls associated with the one or more of the metamorphic symbols if the one or more of the metamorphic symbols have advanced from a current state to a different state.

In some examples, the reel outcomes and/or associated reel awards may be predetermined based on available multipliers, bingo game outcome(s), and/or bingo game award(s). In such an example, the determinations in blocks 604 may involve accessing, loading, and/or retrieving the appropriate predetermined reel outcomes and/or associated reel awards, such as from memory 208 and/or one or more of the server computers 102. In some examples, several sets of spinning reel game facades and/or features may be scripted during development by a game designer. Each set may be comprised of one or more ordered combinations of outcomes that sum to a certain bingo game award.

It should be appreciated that a free reel spin feature (e.g., Red Screen Free spins) may be run instead of or in addition to the reel game simulation with metamorphic symbols. In such a free reel spin feature mode, though approaching the feature mode operation differently, the control process 600 would determine a sequence of metamorphic symbols.

At block 610, the reel game simulations are displayed and/or animated on the graphical interface to the player. As shown, the control process 600 proceeds to determine whether any of the metamorphic symbols has reached an award state at block 620. In some embodiments, the bingo prize and corresponding chosen façade may optionally determine whether the metamorphic symbols are awarded, regardless of a current "expansion state" of the metamorphic symbols. For example, a mystery metamorphic symbol may award a given prize even when the metamorphic symbol is in an initial state, or an intermediate state. When the control process 600 determines that none of the metamorphic symbols has reached an award state at step 620, the control process 600 reverts from block 628 back to the start block 602 if it is determined that the bingo game should continue. However, when the control process 600 determines that at least one of the metamorphic symbols has reached an award state at step 620, the control process 600 proceeds to block 632. At block 632, the control process 600 may control the display device to animate (for example, a popping or cracking) the metamorphic symbol to reveal or distribute an associated identifier as discussed above. By way of one example, the animation or display sequence may randomly distribute a number of WILDS won onto the reels. Thereafter, the control process 600 proceeds to block 628 to determine if the bingo game should continue. At block 624, if the bingo game is finished, the bingo game is ended. This advance in gaming technology also provides increases player satisfaction, engagement and/or excitement while meeting the regulatory requirements of the base or primary game, e.g., Class II bingo.

As indicated above, the control process 600 may be embodied in program code. The program code may be supplied in a number of ways, for example on a tangible computer readable storage medium, such as a disc or a memory device, e.g., an EEPROM, (for example, that could replace part of memory 208) or as a data signal (for example, by transmitting it from a server). Further, different parts of the program code can be executed by different devices, for example in a client server relationship. Persons skilled in the art will appreciate that program code provides a series of instructions executable by the processor.

FIGS. 7-21 represent ornamental aspects of the gaming device 200 (of FIG. 2) in the form of a number of GUI's 500A-500O, and not functional features. Those ornamental aspects do not form a part of the claimed invention.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device comprising:
   a player interface operable to determine player inputs;
   a display device operable to display a reel-simulated bingo game employing a plurality of reels, the plurality of reels having a plurality of display positions, respectively, and at least one reel sharing a wall of an adjacent reel; and
   a controller comprising at least one processor and a memory storing a weighted table controlling a predetermined volatility, a symbol set having a plurality of symbols including a plurality of metamorphic symbols, each of the plurality of metamorphic symbols having a plurality of states including an award state, and a plurality of sequences of instructions, which, when executed, cause the at least one processor to at least:
      control the display device to display at the plurality of display positions, in response to an occurrence of a trigger condition in a bingo game initiated via the player interface, a first metamorphic symbol selected based on the weighted table to control the predetermined volatility, and one or more symbols selected randomly based on a random number generated by a random number generator,
      control the display device to animate the first metamorphic symbol being transformed into an expanded metamorphic symbol, and the wall associated with the expanded metamorphic symbol being deformed and overlaying at least a portion of the adjacent reel, and
      in response to the expanded metamorphic symbol having reached the award state and having further deformed the wall, control the display device to animate an effect associated with the expanded metamorphic symbol being distributed to the one or more symbols selected.

2. The electronic gaming device of claim 1, wherein the effect comprises at least one of a wild, a multiplier, a jackpot, and a cash-on-reel symbol identifier.

3. The electronic gaming device of claim 1, wherein the plurality of states comprise at least one intermediate state in which the expanded metamorphic symbol expands without deforming the wall associated with the expanded metamorphic symbol.

4. The electronic gaming device of claim 1, wherein the sequences of instructions, when executed, cause the at least one processor to distribute the effect randomly.

5. The electronic gaming device of claim 1, wherein the sequences of instructions, when executed, cause the at least one processor to control the display device to animate the one or more symbols selected having the effect to remain persistent for at least one subsequent game.

6. The electronic gaming device of claim 1, wherein the trigger condition comprises at least one of a number of winning outcomes of the bingo game, one of a plurality of winning bingo patterns corresponding to one or more flags in a paytable for the bingo game, and a priority of the plurality of winning bingo patterns in the paytable.

7. The electronic gaming device of claim 1, wherein the first metamorphic symbol has a symbol identifier, identifying a status of the first metamorphic symbol, and wherein the sequences of instructions, when executed, cause the at least one processor to control the display device to animate the first metamorphic symbol being transformed differently based on an associated symbol identifier on the first metamorphic symbol.

8. A method of controlling a predetermined volatility in a reel-simulated bingo game on a gaming device, the gaming device comprising a player interface operable to determine a player input, a display device operable to display the reel-simulated bingo game employing a plurality of reels, the plurality of reels having a plurality of display positions, respectively, and at least one reel sharing a wall of an adjacent reel, and a controller comprising at least one processor and a memory storing a weighted table controlling the predetermined volatility, a symbol set having a plurality of symbols including a plurality of metamorphic symbols, each of the plurality of metamorphic symbols having a plurality of states including an award state, the method comprising:
   receiving a signal indicative of the player input to initiate a bingo game at the player interface;
   controlling the display device to animate at the plurality of display positions, in response to an occurrence of a trigger condition at the bingo game, a first metamorphic symbol selected based on the weighted table to control the predetermined volatility, and one or more symbols selected randomly based on a random number generated by a random number generator;
   transforming the first metamorphic symbol into an expanded metamorphic symbol thereby deforming the wall associated with the expanded metamorphic symbol and overlaying at least a portion of the adjacent reel; and
   controlling the display device to animate, in response to the expanded metamorphic symbol having reached the award state and having further deformed the wall, a distribution of the expanded metamorphic symbol to the one or more symbols selected.

9. The method of claim 8, wherein the distribution of the expanded metamorphic symbol comprises distributing at least one of a wild, a multiplier, a jackpot, and a cash-on-reel symbol identifier.

10. The method of claim 8, wherein the plurality of states comprise at least one intermediate state in which the expanded metamorphic symbol expands without deforming the wall associated with the expanded metamorphic symbol.

11. The method of claim 8, further comprising distributing the expanded metamorphic symbol randomly to the one or more symbols selected.

12. The method of claim 8, further comprising animating the one or more symbols selected having a distributed portion of the expanded metamorphic symbol to remain persistent for at least one subsequent game.

13. The method of claim 8, wherein the trigger condition comprises at least one of a number of winning outcomes of the bingo game, one of a plurality of winning bingo patterns corresponding to one or more flags in a paytable for the bingo game, and a priority of the plurality of winning bingo patterns in the paytable.

14. The method of claim 8, wherein the first metamorphic symbol has a symbol identifier, further comprising identifying a status of the first metamorphic symbol, and animating the first metamorphic symbol being transformed differently based on an associated symbol identifier on the first metamorphic symbol.

15. A non-transitory computer-readable medium comprising a weighted table controlling a predetermined volatility, a symbol set having a plurality of symbols including a plurality of metamorphic symbols, each of the plurality of metamorphic symbols having a plurality of states including an award state, and a plurality of sequences of instructions for operating a reel-simulated bingo game on a gaming device including a player interface operable to determine player inputs, a display device operable to display the reel-simulated bingo game employing a plurality of reels, the plurality of reels having a plurality of display positions, respectively, and at least one reel sharing a wall of an adjacent reel, and a controller comprising at least one processor, and the plurality of sequences of instructions, which, when executed, cause the at least one processor to at least the steps of:

transmitting to the display device, in response to an occurrence of a trigger condition in a bingo game initiated via the player interface, data indicative of a first metamorphic symbol selected based on the weighted table to control the predetermined volatility, and one or more symbols selected randomly based on a random number generated by a random number generator, for display at the plurality of display positions;

controlling the display to visually transform the first metamorphic symbol into an expanded metamorphic symbol;

in response to the expanded metamorphic symbol in a reel of the plurality of reels, expanding the wall associated with the expanded metamorphic symbol to overlay at least a portion of the adjacent reel; and controlling the display to visually distribute an effect associated with the expanded metamorphic symbol being distributed to the one or more symbols selected, in response to the expanded metamorphic symbol having reached the award state.

16. The non-transitory computer-readable medium of claim 15, wherein the effect comprises at least one of a wild, a multiplier, a jackpot, and a cash-on-reel symbol identifier.

17. The non-transitory computer-readable medium of claim 15, wherein the plurality of states comprise at least one intermediate state in which the expanded metamorphic symbol expands without deforming the wall associated with the expanded metamorphic symbol.

18. The non-transitory computer-readable medium of claim 15, wherein the sequences of instructions, when executed, cause the at least one processor to perform the step of animating the one or more symbols selected having the effect to remain persistent for at least one subsequent game.

19. The non-transitory computer-readable medium of claim 15, wherein the trigger condition comprises at least one of a number of winning outcomes of the bingo game, one of a plurality of winning bingo patterns corresponding to one or more flags in a paytable for the bingo game, and a priority of the plurality of winning bingo patterns in the paytable.

20. The non-transitory computer-readable medium of claim 15, wherein the first metamorphic symbol has a symbol identifier, identifying a status of the first metamorphic symbol, and wherein the sequences of instructions, when executed, cause the at least one processor to perform the step of animating the first metamorphic symbol being transformed differently based on an associated symbol identifier on the first metamorphic symbol.

* * * * *